(12) United States Patent
Dao et al.

(10) Patent No.: US 10,793,044 B2
(45) Date of Patent: *Oct. 6, 2020

(54) VEHICLE VENDING SYSTEM

(71) Applicant: IN-VEHICLE VENDING SYSTEM LLC., Naples, FL (US)

(72) Inventors: Daniel Dao, Yorba Linda, CA (US); Quinn Chi, Long Beach, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/403,772

(22) Filed: May 6, 2019

(65) Prior Publication Data

US 2019/0322203 A1    Oct. 24, 2019

Related U.S. Application Data

(63) Continuation-in-part of application No. 16/139,808, filed on Sep. 24, 2018, now abandoned, which is a
(Continued)

(51) Int. Cl.
*G07F 11/10* (2006.01)
*G07F 11/22* (2006.01)
(Continued)

(52) U.S. Cl.
CPC .............. *B60N 3/18* (2013.01); *G06Q 30/06* (2013.01); *G07F 9/105* (2013.01); *G07F 11/10* (2013.01); *G07F 11/22* (2013.01); *G07F 17/0071* (2013.01)

(58) Field of Classification Search
None
See application file for complete search history.

(56) References Cited

U.S. PATENT DOCUMENTS 3,172,713 A    3/1965  Rupert
4,194,647 A    3/1980  Spurrier
(Continued)

FOREIGN PATENT DOCUMENTS

EP    1072020 B1    1/2006

OTHER PUBLICATIONS

International Preliminary Report on Patentability, dated Sep. 8, 2015, for corresponding PCT Application No. PCT/US2014/020258, International Filing Date Mar. 4, 2014, consisting of 5 pages.
(Continued)

*Primary Examiner* — Jacob S. Scott
*Assistant Examiner* — Ayodeji T Ojofeitimi
(74) *Attorney, Agent, or Firm* — David Postolski, Esq.; Gearhart Law LLC

(57) ABSTRACT

Vending systems for use in a vehicle are disclosed. In some embodiments, the systems include the following: a product housing positioned in a vehicle, the product housing including an exposed surface having a product delivery opening; a removable inventory cartridge; a product dispensing mechanism including a product dispensing opening, the product dispensing mechanism being configured for dispensing a product from the removable inventory cartridge in the product housing to the product dispensing opening; a product delivery conduit including a first end and a second end, the first end being joined with the product dispensing opening and the second end defining a product delivery opening, which is formed in the exposed top surface of the product housing and positioned in a passenger compartment of the vehicle; and an lifting mechanism positioned within the product delivery conduit for mechanically lifting the product dispensing opening to the product delivery opening.

20 Claims, 20 Drawing Sheets

Related U.S. Application Data continuation of application No. 14/772,810, filed as application No. PCT/US2014/020258 on Mar. 4, 2014, now Pat. No. 10,124,708.

(60) Provisional application No. 61/890,941, filed on Oct. 15, 2013, provisional application No. 61/772,006, filed on Mar. 4, 2013.

(51) Int. Cl.
<br>    *B60N 3/18*    (2006.01)
<br>    *G06Q 30/06*    (2012.01)
<br>    *G07F 9/10*    (2006.01)
<br>    *G07F 17/00*    (2006.01)

(56) References Cited

U.S. PATENT DOCUMENTS

| | | |
|---|---|---|
| 6,092,381 A | 7/2000 | Hsiao et al. |
| 6,234,345 B1 | 5/2001 | Minh et al. |
| 6,330,958 B1 | 12/2001 | Ruskin et al. |
| 6,390,328 B1 | 5/2002 | Obermeier et al. |
| 6,739,475 B2 | 5/2004 | San Martin et al. |
| 7,418,311 B1 | 8/2008 | Lagassey et al. |
| 8,655,485 B2 | 2/2014 | Garber et al. |
| 10,124,708 B2 * | 11/2018 | Dao ............... G06Q 30/06 |
| 2004/0108326 A1 | 6/2004 | Kelly et al. |
| 2004/0249502 A1 | 12/2004 | Truong et al. |
| 2011/0071669 A1 | 3/2011 | Garber et al. |
| 2012/0043345 A1 | 2/2012 | Garber et al. |
| 2015/0088306 A1 * | 3/2015 | Varrasso ............ G06Q 20/203 700/236 |

OTHER PUBLICATIONS

International Search Report, dated Jun. 26, 2014, for corresponding PCT Application No. PCT/US2014/020258, International Filing Date Mar. 4, 2014, consisting of 2 pages.

Written Opinion of the International Searching Authority, dated Jun. 26, 2014, for corresponding PCT Application No. PCT/US2014/020258, International Filing Date Mar. 4, 2014, consisting of 4 pages.

\* cited by examiner

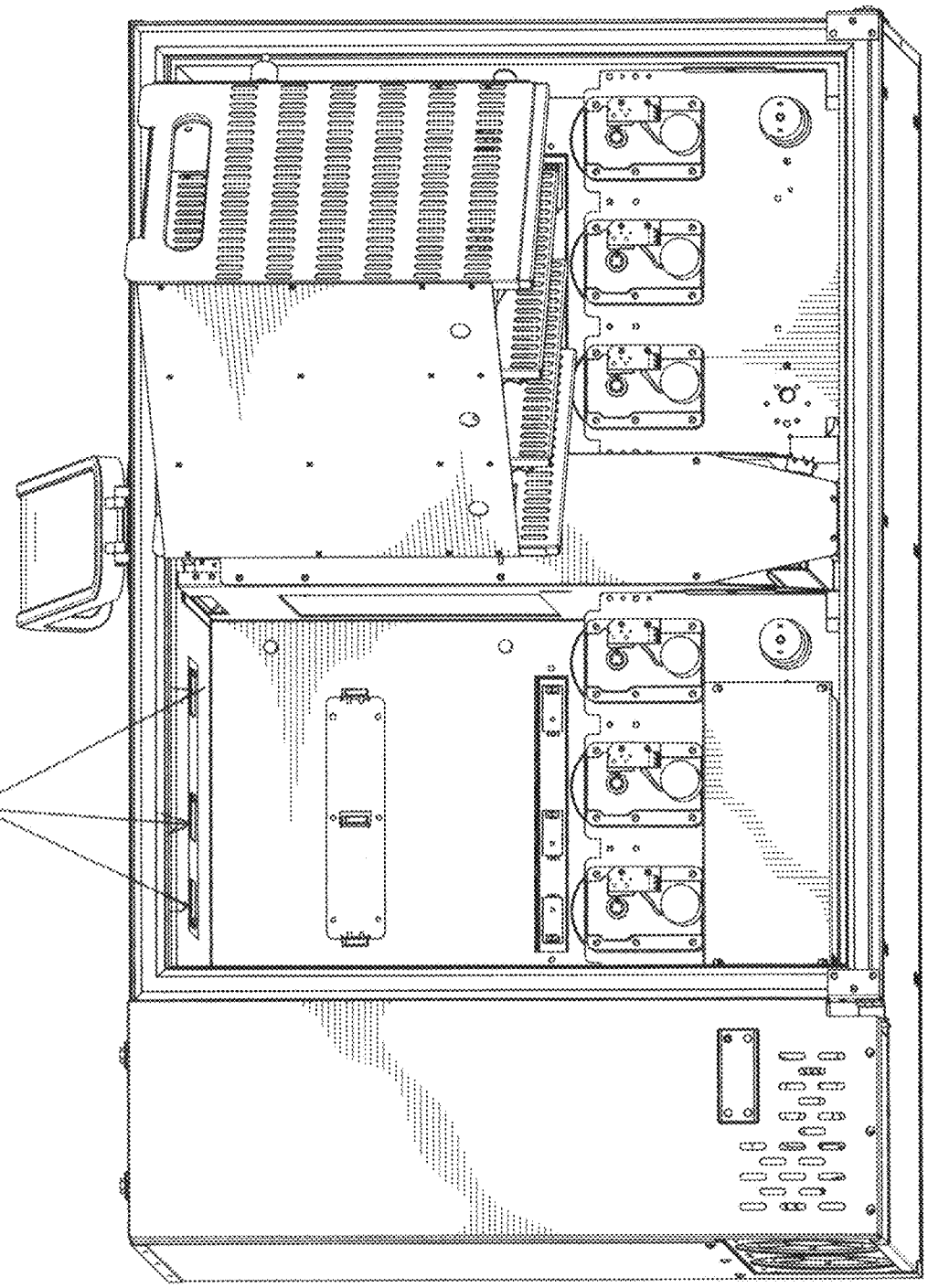

VEHICLE VENDING SYSTEM

CLAIM OF PRIORITY

This application is a continuation-in-part of U.S. patent application Ser. No. 16/139,808, filed Sep. 24, 2018, which is a continuation of U.S. patent application Ser. No. 14/772,810, filed Sep. 4, 2015, which is a national stage filing of International Application Number PCT/US2014/020258, filed Mar. 4, 2014, which claims the benefit of U.S. Provisional Application Nos. 61/772,006, filed Mar. 4, 2013, and 61/890,941, filed Oct. 15, 2013, all of which are incorporated by reference as if disclosed herein in their entireties.

FIELD OF THE EMBODIMENTS

This invention relates to vending machines and, in particular, to vending machines housed within, and accessed within, moving vehicles.

BACKGROUND OF THE EMBODIMENTS

Passengers traveling via various modes of transportation, e.g., planes, trains, boats, etc., have long been able to purchase food, beverages, and other products while en route via service counters. Until recently passengers traveling in certain passenger vehicles, e.g., cabs and limousines have not been able to purchase products via non-attended, automated vending machines while en route.

Mobile vending systems are generally known in the art. However, all known systems suffer from serious shortcomings. One known system includes a vending machine incorporated into the back of a passenger seat. However, the vending machine does not accommodate refrigerated items.

Another known system includes equipment that dispenses drinks and snacks from a golf-cart. The disclosed vending machine includes three parts: a top part for holding snacks; a middle part for holding beverages; and a bottom part which is a refrigeration unit. The three parts are contained within a housing that fits within the basket of a golf cart. However, the vending machine is to be mounted on the roof of the golf cart, or towed behind in a trailer unit. This configuration is not suitable for the confines of a vehicle because the products would not be available from within the passenger area.

Yet another known system includes a vending machine and cooling dispenser suited to environments with limited space. The dispenser is formed from a serpentine configuration. Vending without selection buttons is achieved by cradles and an interlock system. Installation of this configuration in a vehicle with limited space, such as a bus, taxicab, or limousine would require significant alterations resulting in decreased passenger comfort, impediment of ingress and egress, and reduction in passenger load capacity.

Another known system discloses a vending machine and associated control system in support of vending one or more items to a passenger in a rear passenger salon of a taxicab. One code module communicates vended item cost information to another module for inclusion in a calculation of a total fare for the taxicab ride and any vended items. This system can be refrigerated using, in part, the taxicab's air-conditioning system. However, installation of this system in a vehicle does not allow for modular loading of custom inventory cartridges and requires significant downtime and potential lost revenue when replenishment of items to be vended is required.

Another known system discloses a refrigerated vending system for installation in a taxicab. This application discloses a housing having an interior compartment configured to include at least a plurality of items therein and an exterior structurally adapted to seat against the surface of the front passenger chair that faces the rear passenger salon and proximal to the divider. A vending control system is operative to respond to an actuation by dispensing one of a plurality of items from the interior compartment for access within the rear passenger salon.

However, the installation of this system inside the passenger compartment of a taxicab is disadvantageous because of the loss of space within the vehicle where the system is installed.

SUMMARY OF THE EMBODIMENTS

Aspects of the disclosed subject matter include mobile vending systems that encourage impulse purchases of items such as beverages, food products, or sundries for a high volume market of riders in certain vehicles, such as, for example, planes, trains, cabs, limousines, or buses. The riders have free time travelling in such vehicles while waiting to reach their final destinations. During these idle periods, consumers can utilize systems according to the disclosed subject matter to purchase a wide variety of items such as snack or beverage offered conveniently from mobile vending systems in these vehicles. Systems according to the disclosed subject matter can be adapted for use in almost any type of vehicle without compromising passenger comfort.

Systems according to the disclosed subject matter are designed to be modular to allow for quick removal and replacement of the system or the inventory contained therein. This feature eliminates downtime in vehicles-for-hire during normal operations. For example, a driver need not be involved with the function of the vending system, repairs, or the stocking and re-stocking of vendible products. In addition, due to the space limitations inside vehicles, the vending system is compact while incorporating a quick-change, rotatable inventory system of vendible items. Removable or replaceable cartridges can be refilled or reconfigured at any time thus dramatically increasing the efficiency of operation.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 28 is a side section elevation view of a vending system according to some embodiments of the disclosed subject matter.

DESCRIPTION OF THE PREFERRED EMBODIMENTS

Figure 1:
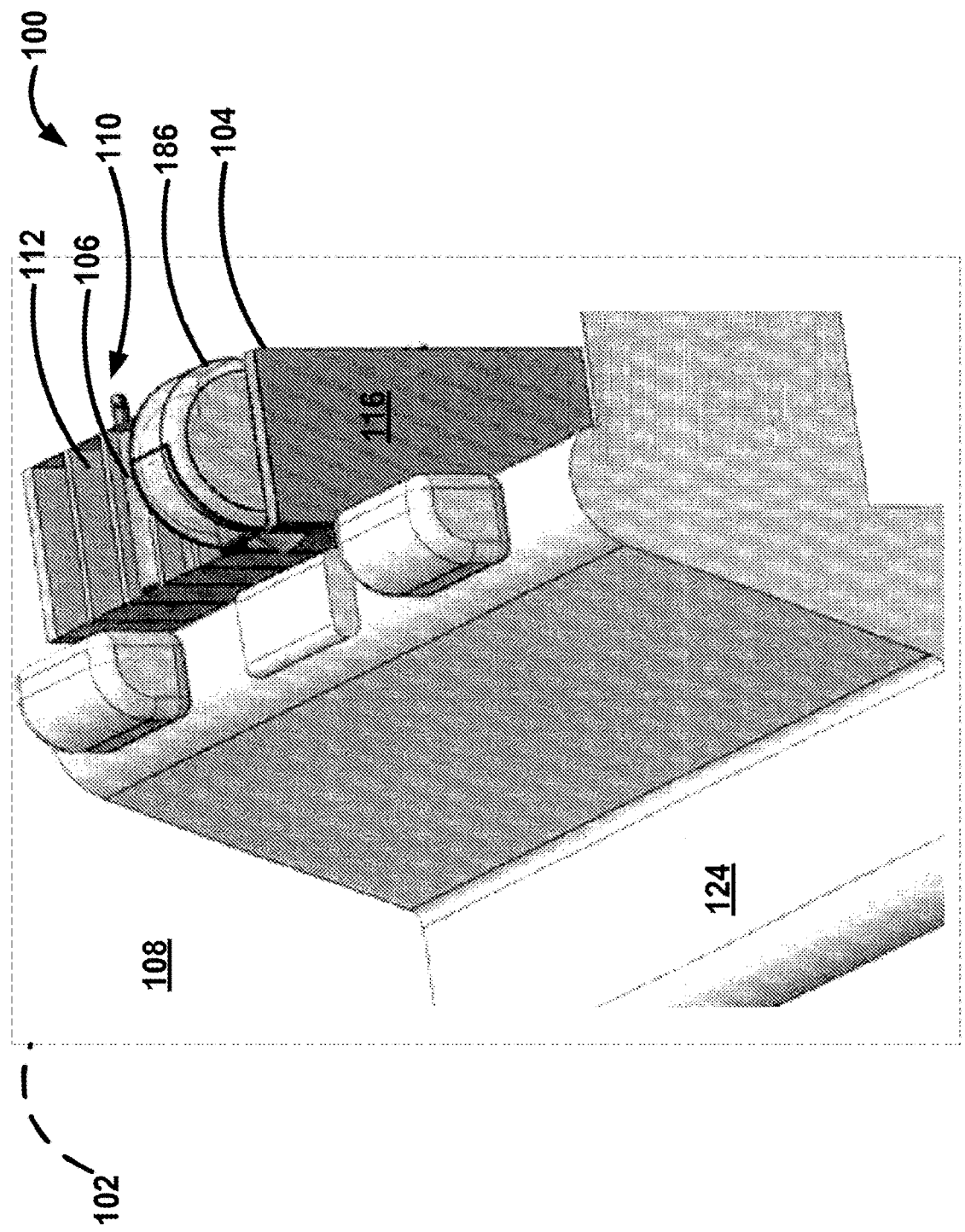
FIG. 1 is a front perspective view of a vending system according to some embodiments of the disclosed subject matter.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1-12 and 25-28, aspects of the disclosed subject matter include a vending system 100 for use in a vehicle 102. In some embodiments, system 100 includes a product housing 104 for storing products 106, e.g., food and beverages, before they are delivered to a passenger compartment 108 in vehicle 102. In some embodiments, system 100 includes a plurality of cooperating modular components 110 positioned within or connected with product housing 104. In some embodiments, modular components 110 includes a removable inventory cartridge 112 removably positioned within product housing 104, a product dispensing mechanism 114 that engages with and dispenses products 106 from the removable inventory cartridge, and a refrigeration module 116 for at least partially refrigerating the product housing. Products are delivered from product housing 104 to passenger compartment 108 via a product delivery conduit 118.

In some embodiments, product housing 104 includes an exposed surface 120 and a product delivery opening 122 formed in the exposed surface. Product housing 104 is typically, but not always, positioned in vehicle 102 behind a rear passenger seat 124. According to an embodiment, the housing 104 includes an inventory 106 access door 250 for accessing the inventory 106.

Figure 5:
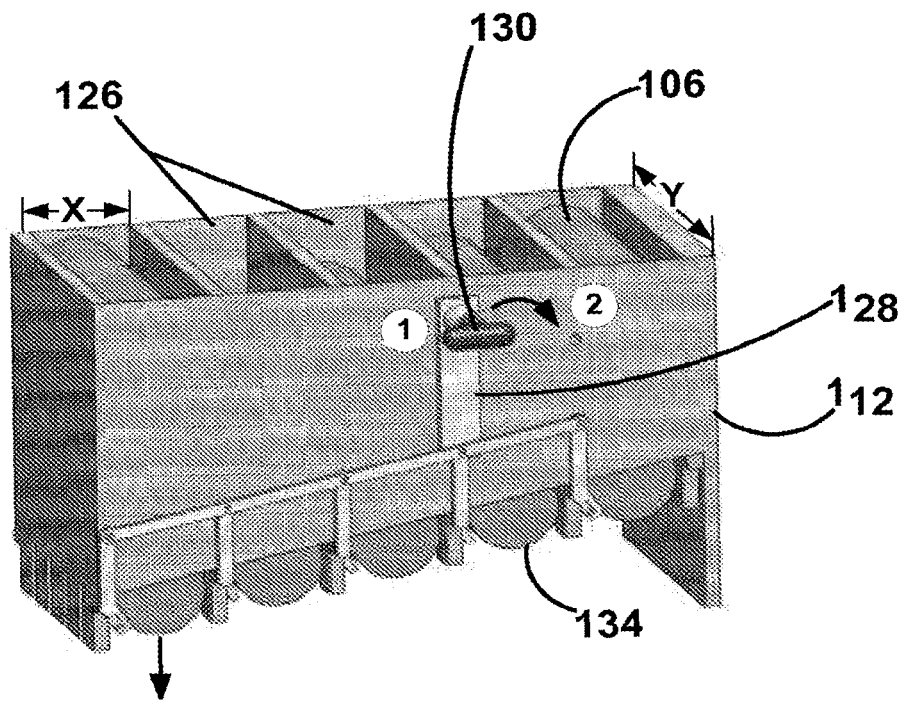
FIG. 5 is a front perspective view of a removable inventory cartridge for a vending system according to some embodiments of the disclosed subject matter.
Figure 6:
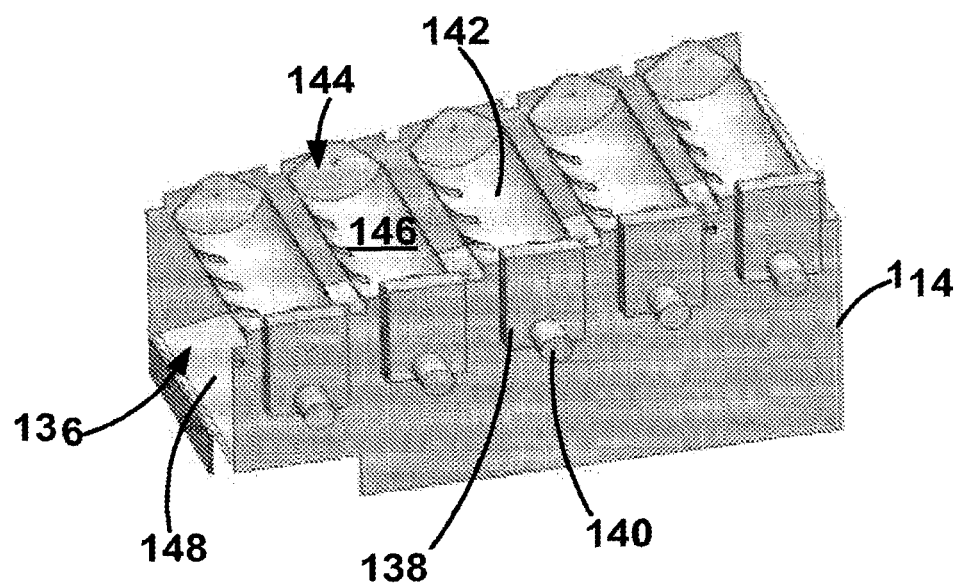
FIG. 6 is a front perspective view of a product dispensing mechanism for a vending system according to some embodiments of the disclosed subject matter.
Figure 7:
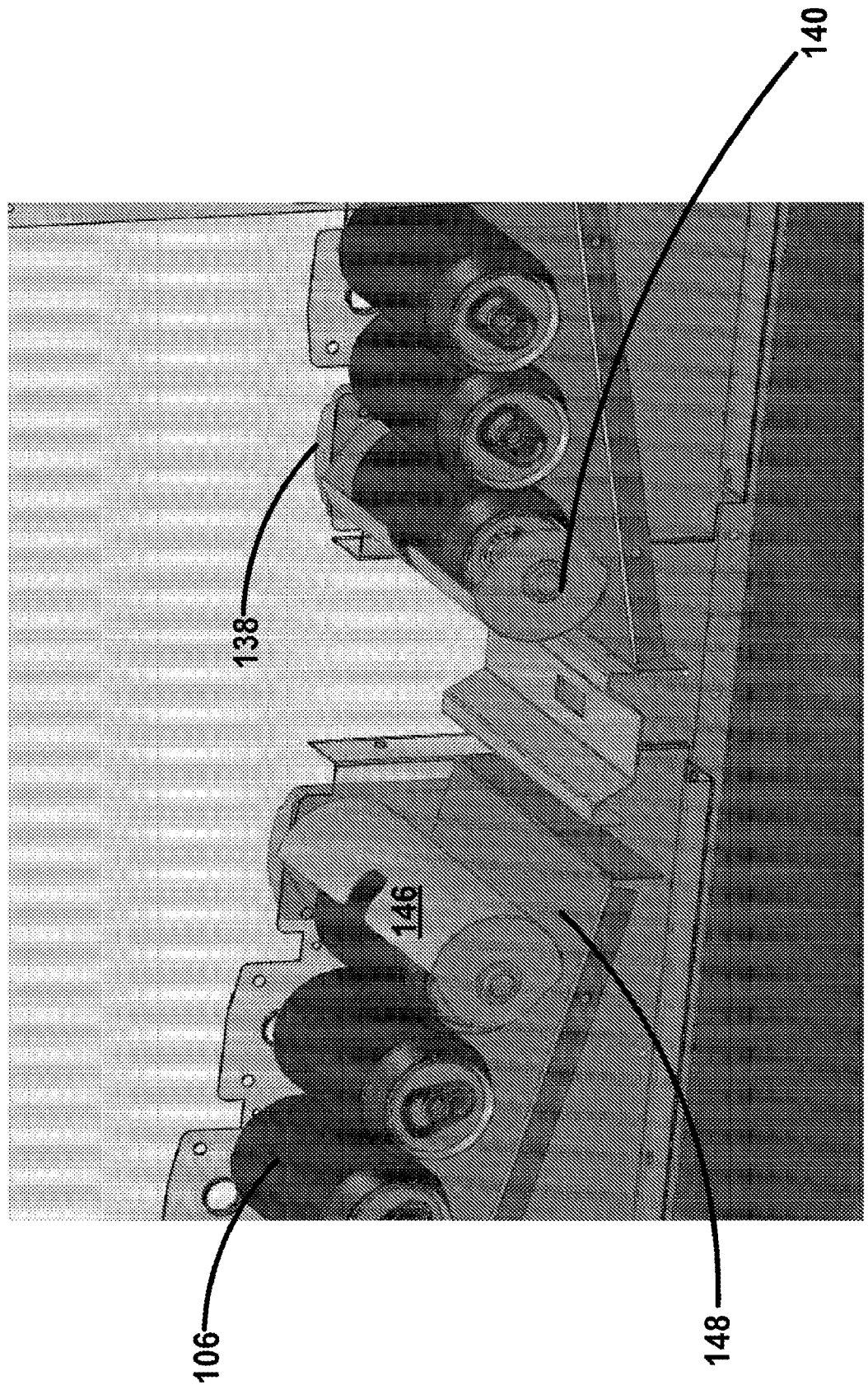
FIG. 7 is a partial front perspective view of a product dispensing mechanism for a vending system according to some embodiments of the disclosed subject matter.

As shown in FIGS. 2, 3, 5 and 6, removable inventory cartridge 112 is removably positioned within product housing 104. As best shown in FIGS. 5 and 6, removable inventory cartridge 112 is typically configured to contain products 106 such as food and beverages but can also be configured to contain other products, e.g., over the counter medicines, combs, tissues, cosmetics, etc. In some embodiments, removable inventory cartridge 112 includes a plurality of adjustable product slots 126 for temporarily retaining products of different sizes within the cartridge. Removable inventory cartridge 112 typically includes a mechanism 128 for preventing products 106 from exiting the cartridge when the cartridge is not positioned within product housing 104. As shown in FIG. 5, in some embodiments, mechanism 128 includes a manual latch 130. At position 1, latch 130 holds products 106 in place in removable inventory cartridge 112. Once removable inventory cartridge 112 is connected to product housing 104 of vending system 100, moving latch 130 to position 2 releases products 106 for vending.

Figure 11:
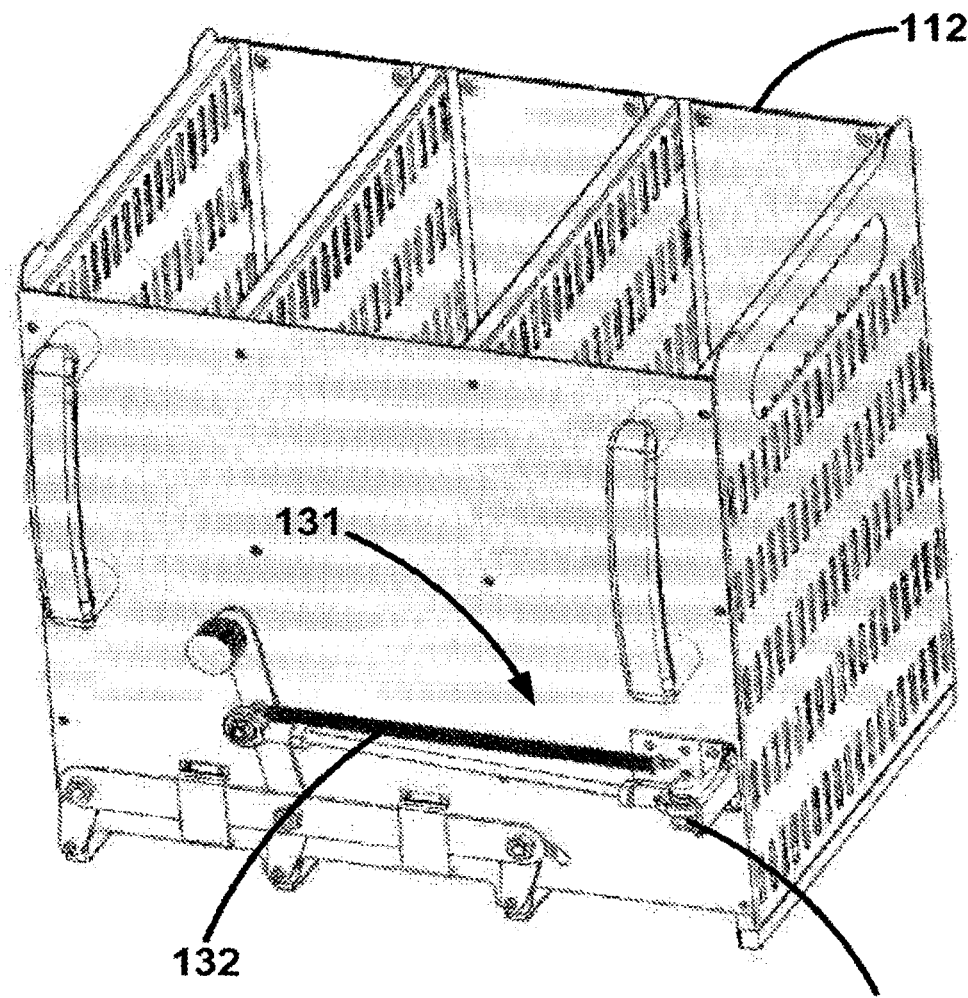
FIG. 11 is a front perspective view of a removable inventory cartridge for a vending system according to some embodiments of the disclosed subject matter.
Figure 12:
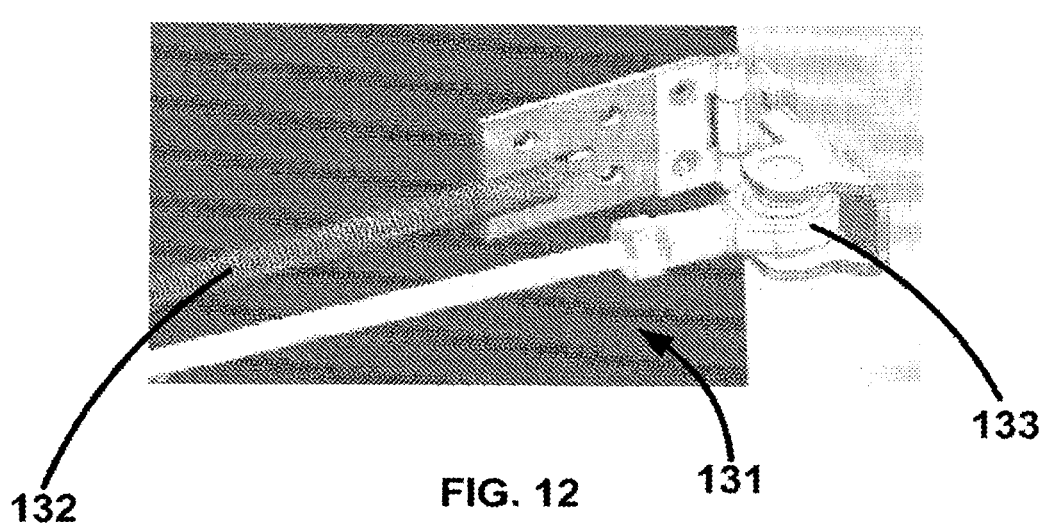
FIG. 12 is an exploded partial view of an auto latch and de-latch mechanism for a vending system according to some embodiments of the disclosed subject matter.

Referring now to FIGS. 11 and 12, in some embodiments, removable inventory cartridge 112 includes an auto latch and de-latch mechanism 131 having a spring 132 (or similar mechanism) that depresses a trigger 133 when removable inventory cartridge 112 is mated to product housing 104 and/or product dispensing mechanism 114.

As mentioned above and illustrated in FIG. 5, in some embodiments, removable inventory cartridge 112 includes multiple apertures or slots 126 to hold cylindrical shaped objects such as soda cans and bottles to be vended. Each aperture can be reshaped and positioned for specific types of products by changing dimensions X and Y to provide a wide range of product storage capabilities. In some embodiments, slots 126 are configured to hold non-cylindrical shaped products by using vessels 134, e.g., canisters, for transporting products 106. In some embodiments, vessels 134 such as canisters are used for non-cylindrical shaped items to dispense such items by gravity thus enabling the product to easily move down a ramp.

Referring now to FIGS. 2, 3, 6, and 7, in some embodiments, product dispensing mechanism 114 includes a product dispensing opening 136, a motor gear assembly 138 for rotating axes 140, and partial cylinder dispensers 142, each of which are joined with a respective one of the axes. Product dispensing mechanism 114 moves or dispenses products 106 from removable inventory cartridge 112 in product housing 104 to product dispensing opening 136.

Figure 8:
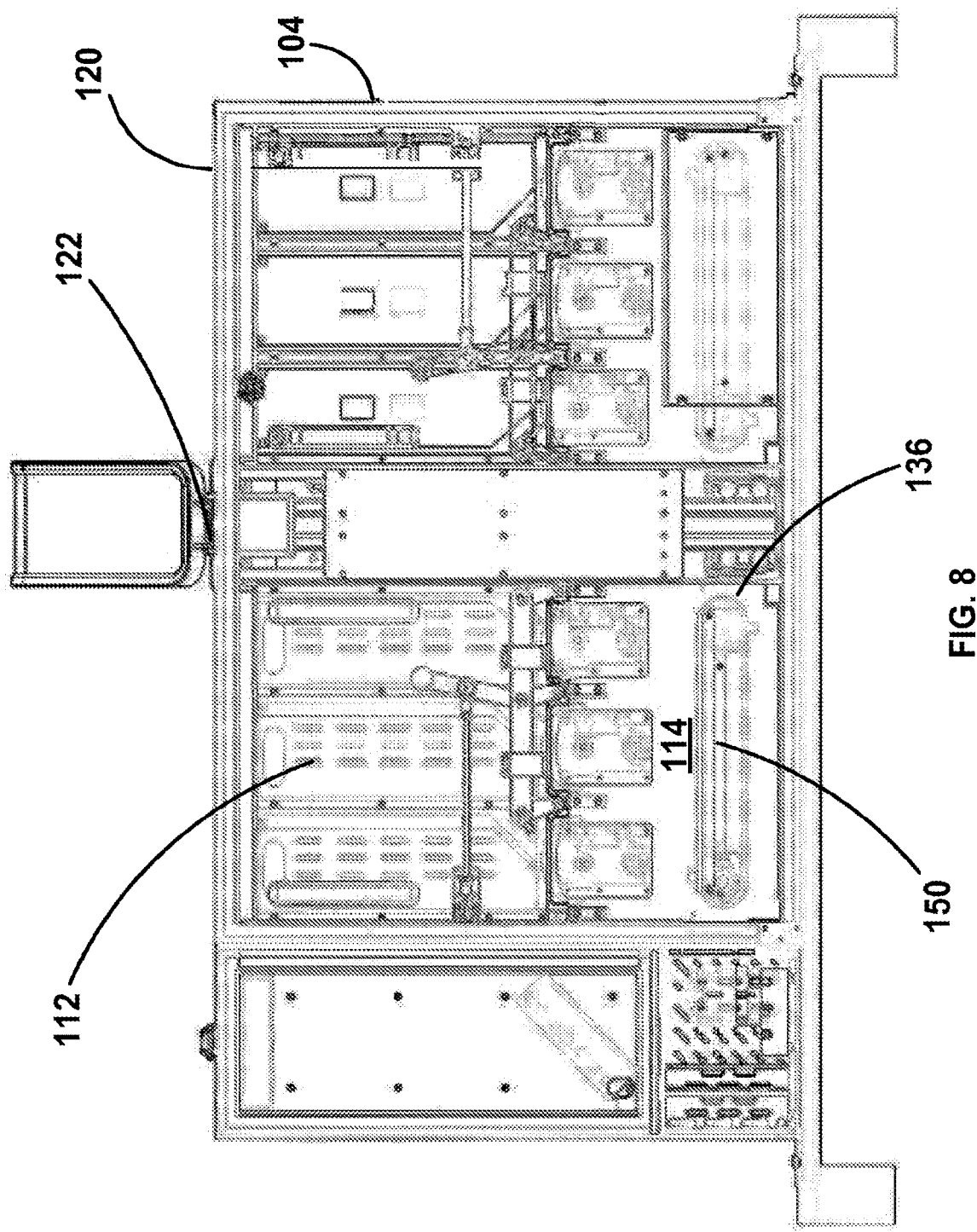
FIG. 8 is a side section elevation view of a vending system according to some embodiments of the disclosed subject matter.
Figure 9:
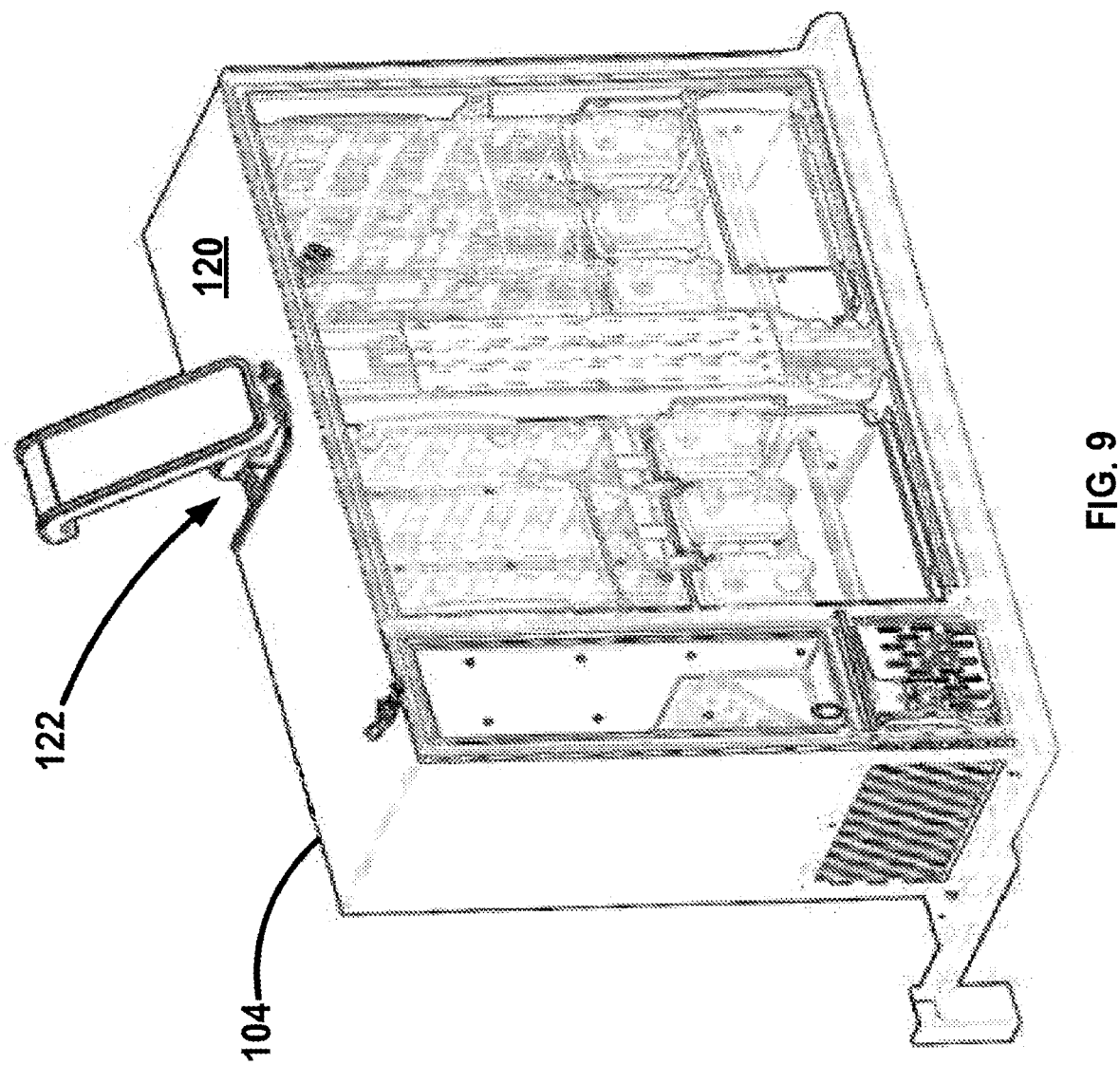
FIG. 9 is a front perspective view of a vending system according to some embodiments of the disclosed subject matter.
Figure 10:
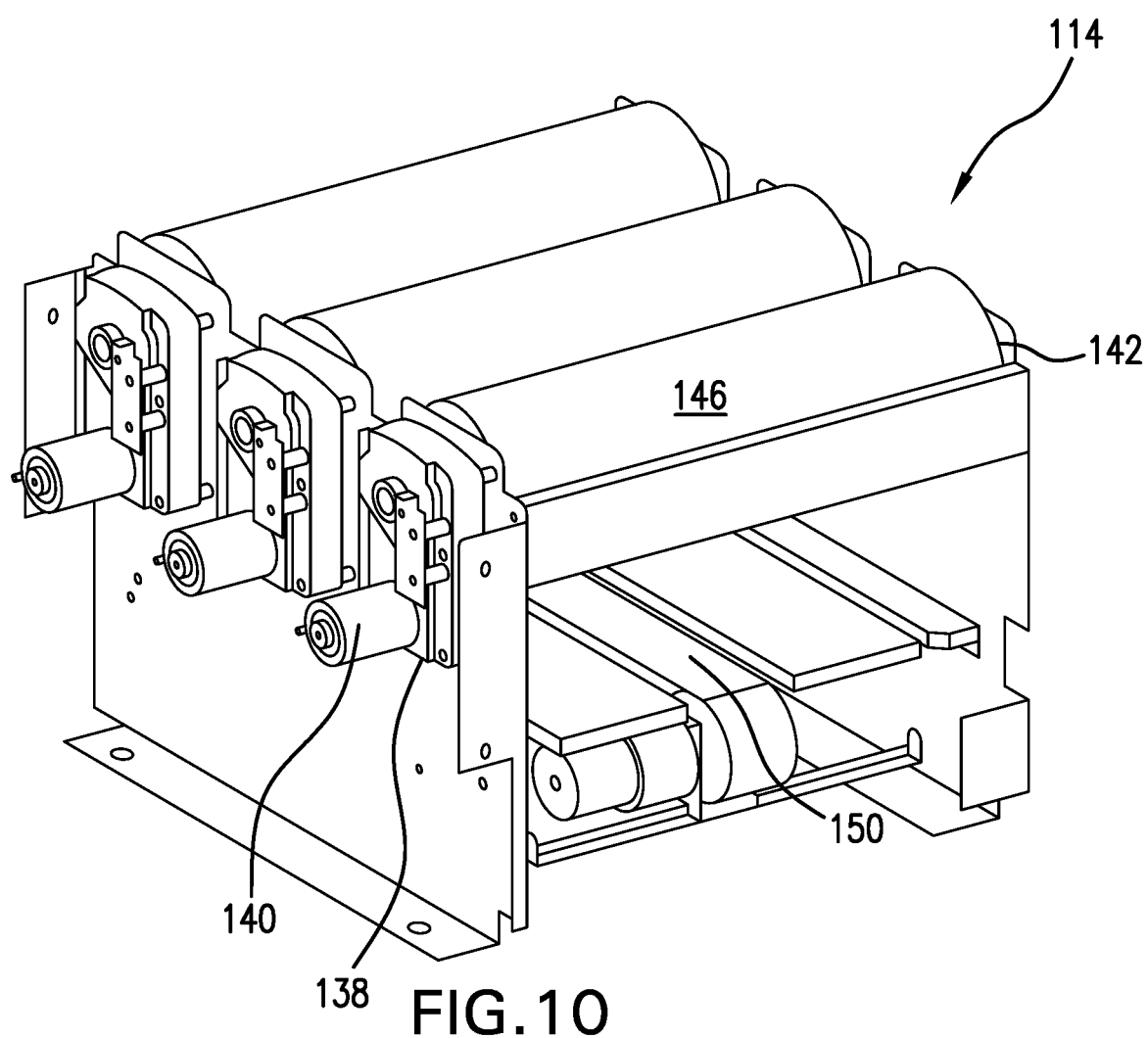
FIG. 10 is a front perspective view of a product dispensing mechanism for a vending system according to some embodiments of the disclosed subject matter.

When a sale occurs, a particular one of dispensers 142 is caused to rotate one full revolution by motor gear assembly 138. The partial cylindrical shape of cylinder dispensers 142 allows vended items to be dispensed via an open-portion 144 of the cylinder dispenser while a closed-portion 146 blocks the next inventory item in slot 126. Of course, as one skilled in the art will appreciate, other geometries, i.e., non-cylindrical, are contemplated to be within the scope of the invention. In some embodiments, product dispensing mechanism 114 includes a ramp 148, which gravity feeds products 106 from removable inventory cartridge 112 to product dispensing opening 136. Referring now to FIGS. 8-10, in some embodiments, product dispensing mechanism 114 includes a moving platform or conveyor 150, which mechanically transports or guides products 106 from removable inventory cartridge 112 to product dispensing opening 136.

Figure 13:
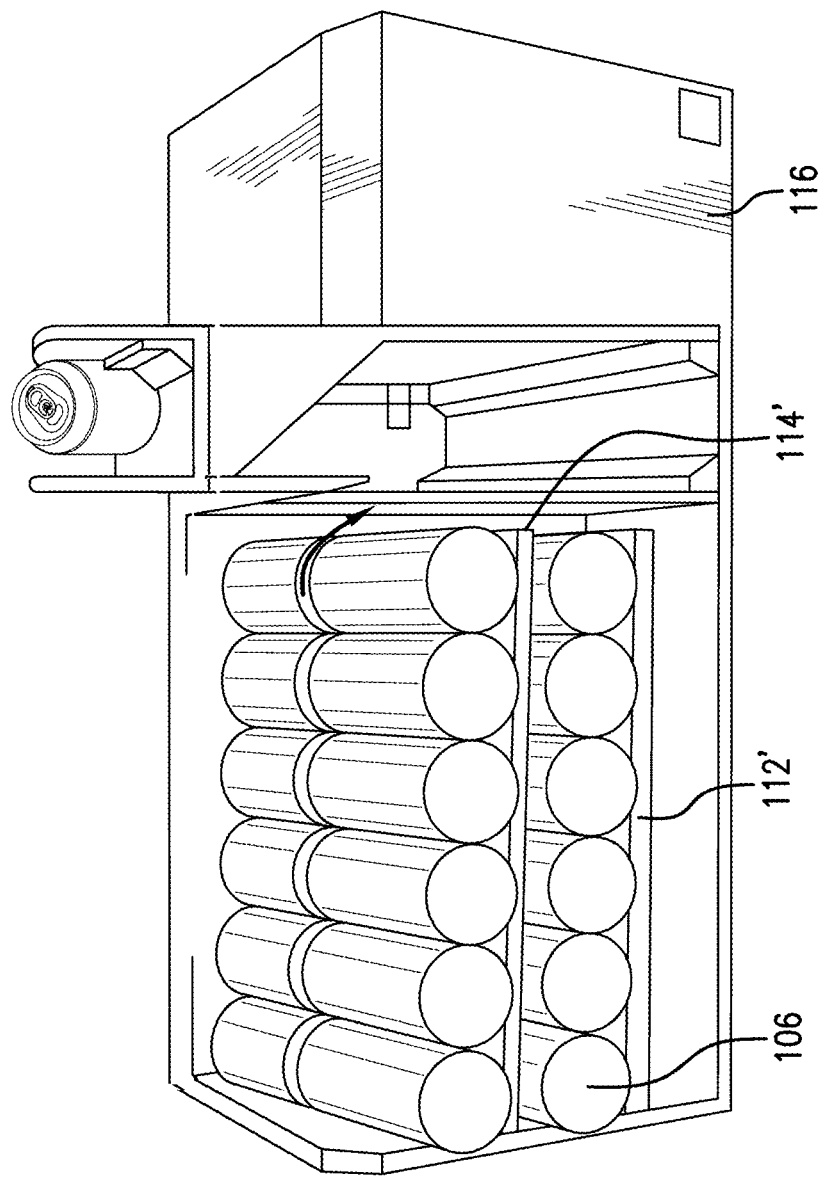
FIG. 13 is a side section elevation view of a vending system according to some embodiments of the disclosed subject matter.

Referring now to FIG. 13, some embodiments of the disclosed subject matter include a removable inventory cartridge 112' and product dispensing mechanism 114' that cooperate to move products 106 horizontally from the removable inventory cartridge to the product dispensing mechanism within product housing 104 versus vertically as described above and illustrated in FIGS. 1-12. Systems according to FIG. 13 are typically best suited for trunk mounted applications.

Figure 14:
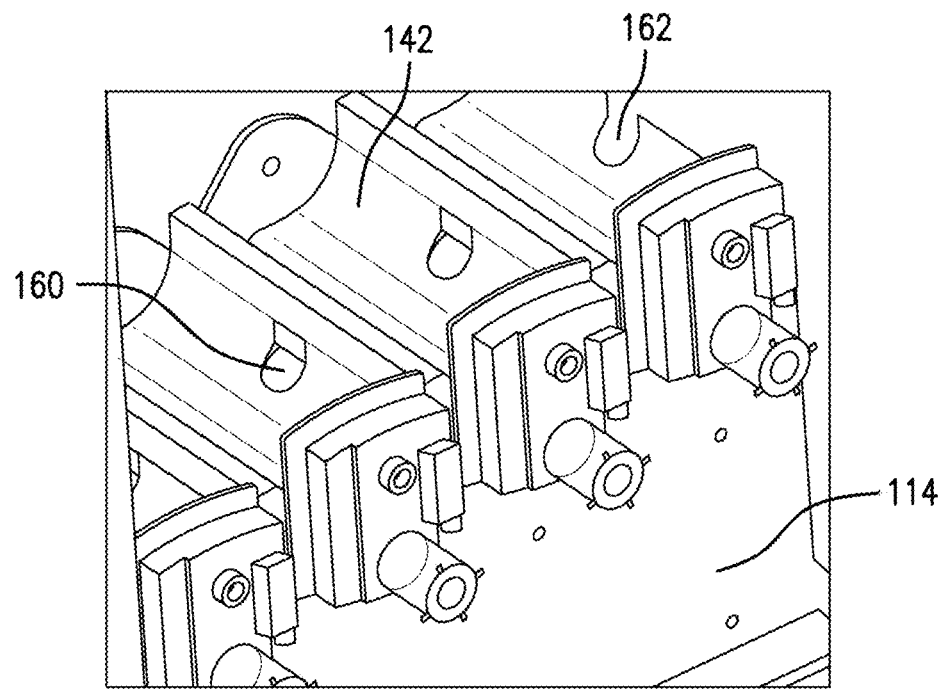
FIG. 14 is a partial front perspective view of a product dispensing mechanism for a vending system according to some embodiments of the disclosed subject matter.
Figure 15:
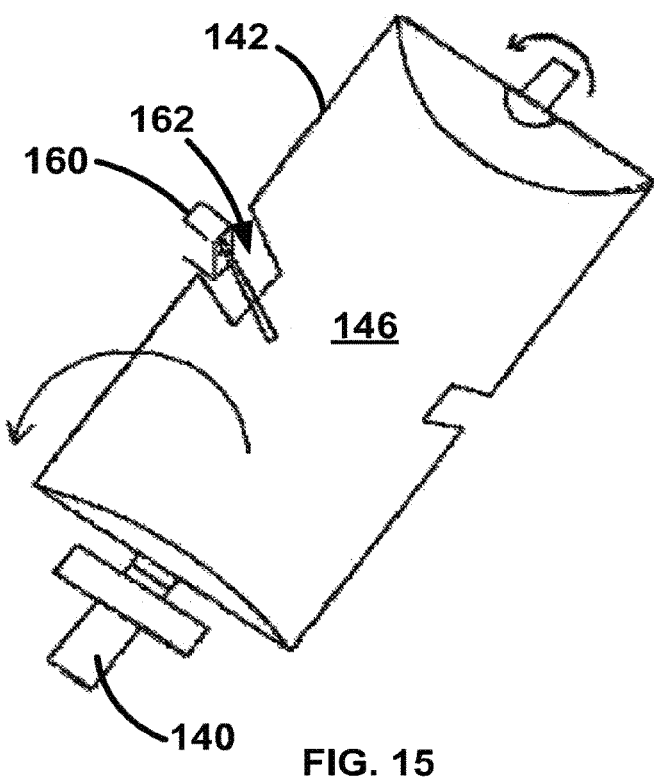
FIG. 15 is a partial front perspective view of a product dispensing mechanism for a vending system according to some embodiments of the disclosed subject matter.

Referring now to FIGS. 14 and 15, in some embodiments, system 100 includes a micro-switch 160 to determine if a product 106 is present in a particular one of dispensers 142. When the system detects the availability of products 106, a user interface (not shown) depicts active products for sale. In one configuration, micro-switch 160 fits within apertures 162 in dispenser 142. Thus, product 106 that drops and is seated in dispenser 142 during a vending operation will activate switch 160, thereby sending a signal to a processor (not shown) for maintaining an accurate count of items in the memory or database (not shown). It will be appreciated that any known sensing method or device, e.g., sensors for detection motion, mass, light, heat, etc. can be used to sense when product is available or not available in a given space. For example, some embodiments include a laser sensor or proximity sensor to detect when product is available or unavailable and send a signal to a control system to record such information and update the user interface to show availability of product. Some embodiments include wireless detection means such radio frequency identification ("RFID") to detect sensors that are tagged onto products.

According to an embodiment, when a particular product 106 is sold out from the vending system 100, the system 100 includes a means of performing a detection process to determine when that particular product 106 is sold out and/or not available for sale. According to an embodiment, a signal is sent to the system 100 and converted to a visual graphic to communicate to consumers that one or more corresponding products 106 are sold out and/or unavailable and are not available for sale. According to an embodiment, Also, the signal is being kept in the system 100 to be updated to the main computer system to let us know that the product is out in a particular vending system.

According to an embodiment, the system 100 includes a removable inventory cartridge which includes a plurality of sensors 262 for detecting whether product 106 is available. According to an embodiment, the sensors 262 are active when the removable cartridges are placed in the vending system 100. The removable cartridges may include carrying handles 260 for ease of insertion and removal from the system 100.

According to an embodiment, the sensors 262 are located in the rear of the system 100 towards the bottom, corresponding to openings in the removable inventory cartridges to detect when the first product to come out of the cartridge is empty or still available. According to an embodiment, the sensors 262 may be of optical, audio, radio signal detection, and/or any other suitable form of sensor. According to an embodiment, the sensors 262 are located on ceiling of the inside of the vending system cavity to detect products below for each corresponding product partition 126.

According to an embodiment, the sensors 262 can detect products 106 for sale based on product ID tag, product shape recognition by camera to determine the proper product identification. It is noted, however, that other means of product identification may also be used, while maintaining the spirit of the present invention. According to an embodiment, products 106 for sale have ID tags that enable communication, such as, e.g., RFID, magnetic signature, NFC, etc. with sensors placed in the vending system 100.

According to an embodiment, the system 100 includes a cooling and/or refrigeration module 116 configured to maintain and/or reduce and/or increase temperature for the inventory 106 and/or for components of the system 100. The system 100 may include a door 270 for accessing the refrigeration module 116.

According to an embodiment, the refrigeration module 116 may be detachable from the system 100 and/or linked via one or more air channels. According to an embodiment, in areas of very limited space allowance, the cooling system 116 may be detached to be allocated in a separate area. According to an embodiment, the refrigeration system 116 links to the main vending system 100 via a plurality of air channels (e.g., one input and one output).

According to an embodiment, the plurality of air channels may include flexible hosing and/or tubing and/or are connected to one or more mobile refrigeration units on the side of the vending system 100. According to an embodiment, the input air channel is higher while the output air channel is lower so a circulation of air is generated internally.

According to an embodiment, the plurality of air channels are connected to one or more mobile refrigeration units on the back/rear of the vending system 100. According to an embodiment, the input air channel is higher while the output air channel is lower so a circulation of air is generated internally.

According to an embodiment, in addition to detecting availability of products 106 to be sold, the system 100 incorporates one or more sensors 272 to determine specific products 106 being placed into the cartridges to be sold. The sensor 272 will determine the product being sold and find a corresponding graphics in the main memory to display the correct product, price, and other information like image, brand, and nutrition for consumers to make selection. The dynamic product detection will also prevent stockers from misplacement of products into slots as the detection will allow for correct pairing for products with its proper information.

Dynamic detection also allows for versatility in placement of products into the vending system. For example, a removable cartridge could be replaced with a new cartridge with different products. The system will detect the new products and will display the proper corresponding information for system tracking and for consumer purchase.

In some embodiments, system 100 includes a method to determine when there are no more products in any given column/slots so that the system will not attempt to vend products which are unavailable. In some embodiments, passive counting is utilized. That is, when a fully loaded removable inventory cartridge is placed into the system housing, the system resets to zero in order to start the count at the fully-loaded cartridge configuration. The system includes at least one memory module and one processor for maintaining a count of items remaining in the removable inventory cartridge. As the products are vended from the removable inventory cartridge, the system subtracts the item and the count is stored within the memory. When an item is sold out, the processor generates a signal to register that an item is "sold out" in the system. In some embodiments, the system records when each item is vended and sends a report to a central database where one or more systems are monitored. In some embodiments, the system includes a wireless transmitter and receiver, e.g., radio frequency, cellular, etc., for sending and receiving wireless information including sales data, operational errors requiring repair, and other useful business information for optimizing sales.

Referring again to FIGS. 2 and 3, product delivery conduit 118 including a first end 170 having a first elevation 172 and a second end 174 having a second elevation 176. First elevation 172 is less than second elevation 176. First end 170 is joined with product dispensing opening 136 of product dispensing mechanism 114 and second end 174 is joined with product delivery opening 122, which is formed in exposed surface 120 of product housing 104 and positioned in passenger compartment 108 of vehicle 102. Product delivery opening 122 is in communication with passenger compartment 108 via the product delivery opening in passenger compartment 108.

Figure 2:
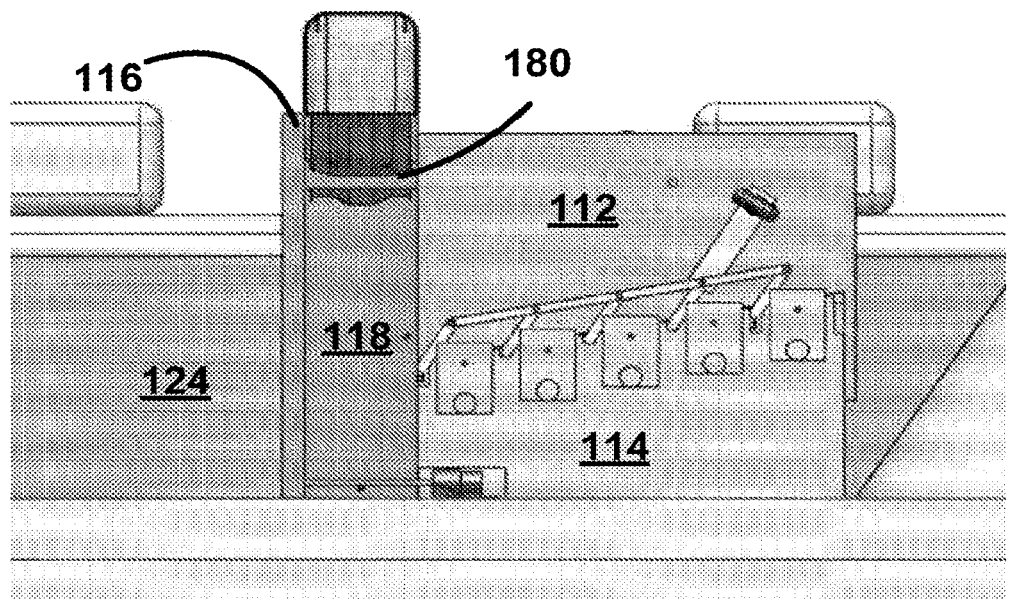
FIG. 2 is a side section elevation view of a vending system according to some embodiments of the disclosed subject matter.
Figure 3:
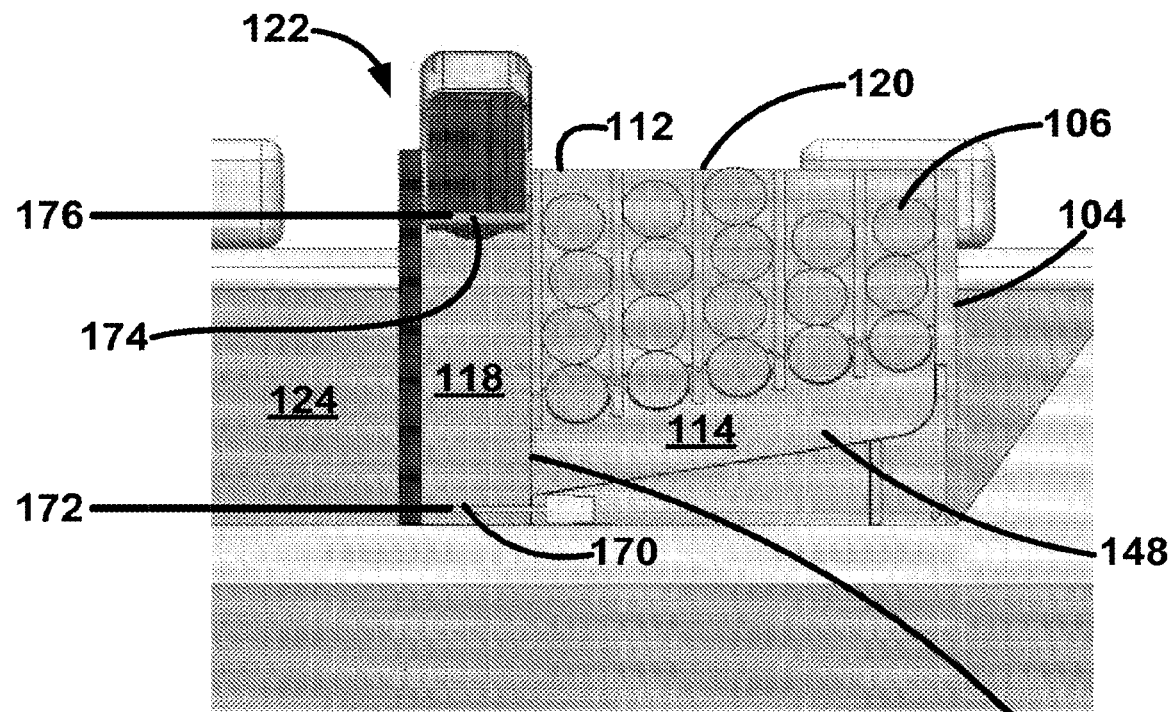
FIG. 3 is a side section elevation view of a vending system according to some embodiments of the disclosed subject matter.
Figure 4:
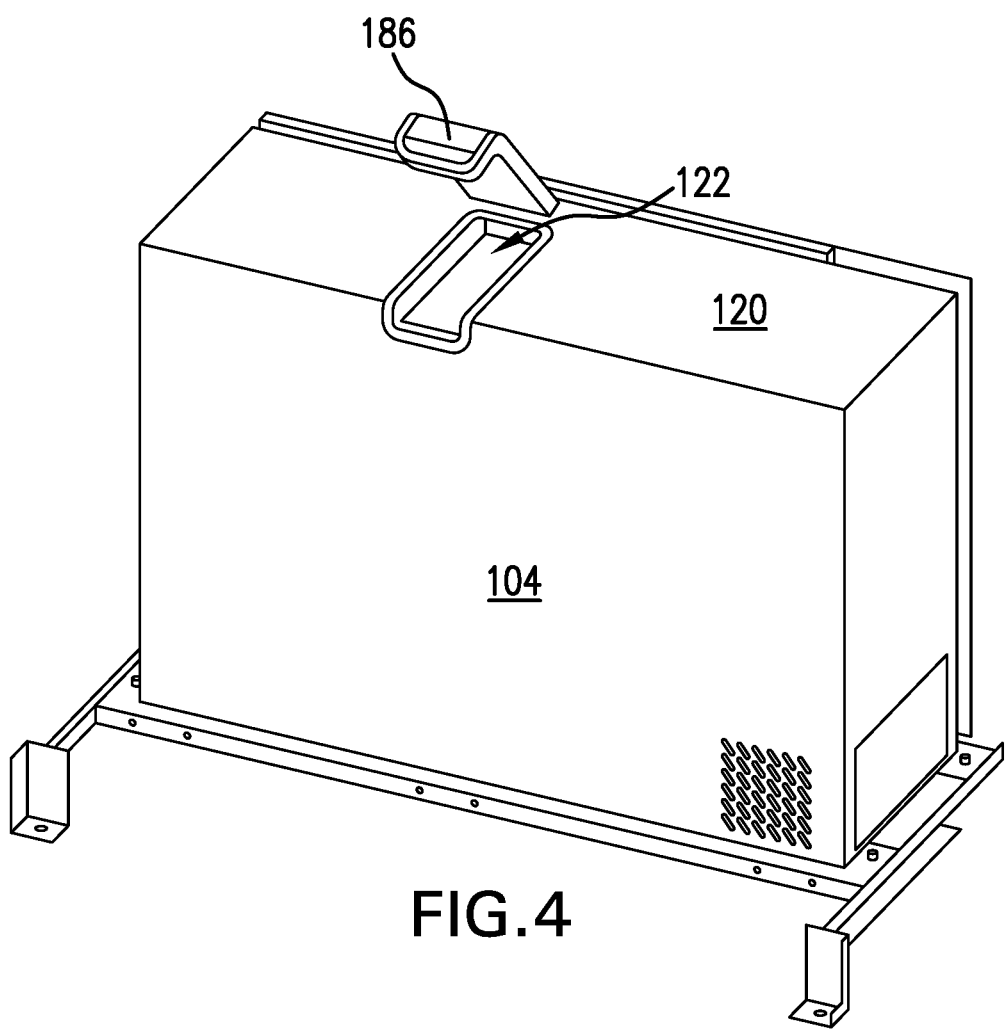
FIG. 4 is a front perspective view of a product housing for a vending system according to some embodiments of the disclosed subject matter.
Figure 16:
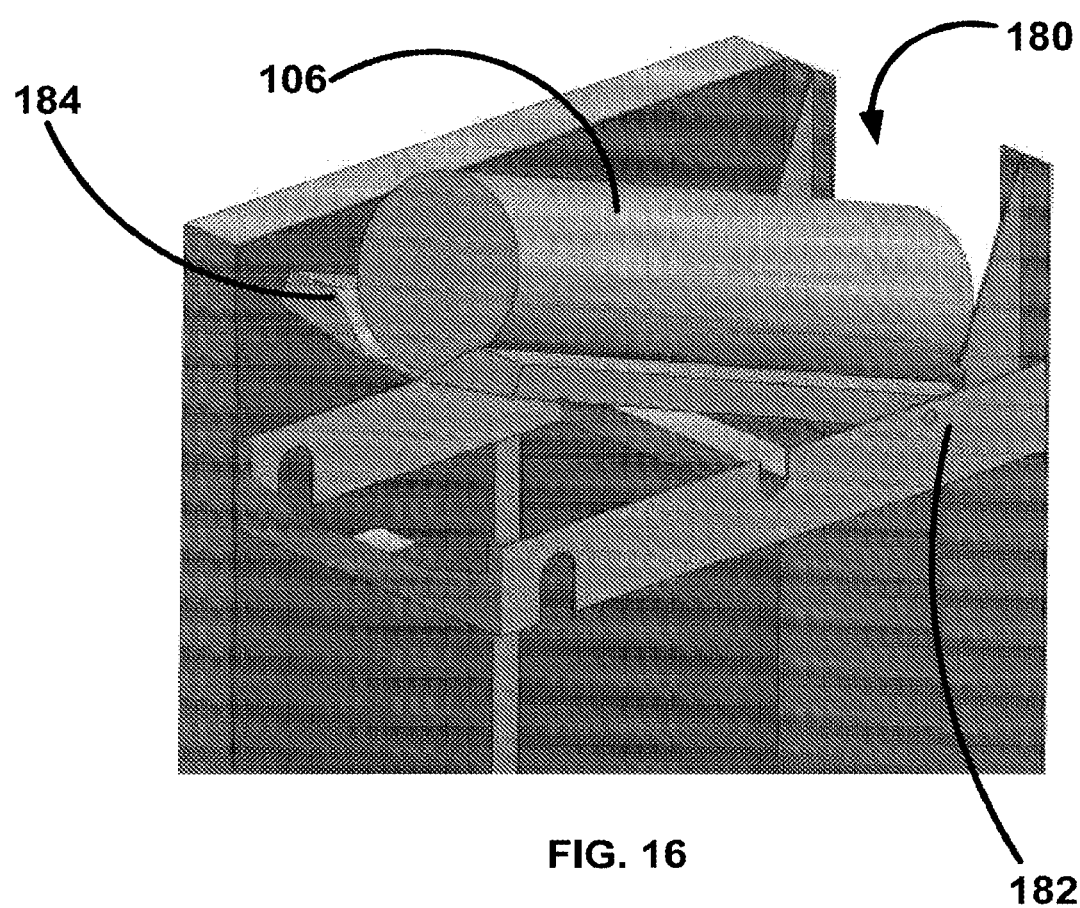
FIG. 16 is a partial front perspective view of a lifting mechanism for a vending system according to some embodiments of the disclosed subject matter.

Still referring to FIGS. 2 and 3, because first elevation 172 is less than second elevation 176, system 100 includes a lifting mechanism 180 positioned within product delivery conduit 118 for mechanically lifting product 106 from product dispensing opening 136 to product delivery opening 122. Lifting mechanism 180 moves a released vended product 106 that has been gravity-fed down ramp 148 or mechanically moved to the lifting mechanism up to an area preferably above rear passenger seat 124 or within reach of a consumer. In this way, consumers can easily access the vended products. Referring now to FIG. 16, in some embodiments, lifting mechanism 180 includes two sections, (1) an external cage 182, which acts to keep the vended product stable, and (2) a second section 184 that is positioned inside the external cage and rotates vended products 106 between about 20 and about 90 degrees, preferably between about 30 and about 45 degrees, at the apex of the lift, i.e., when the product is within reach of a consumer, to allow the product to be visible and easily reachable by the consumer.

Figure 17:
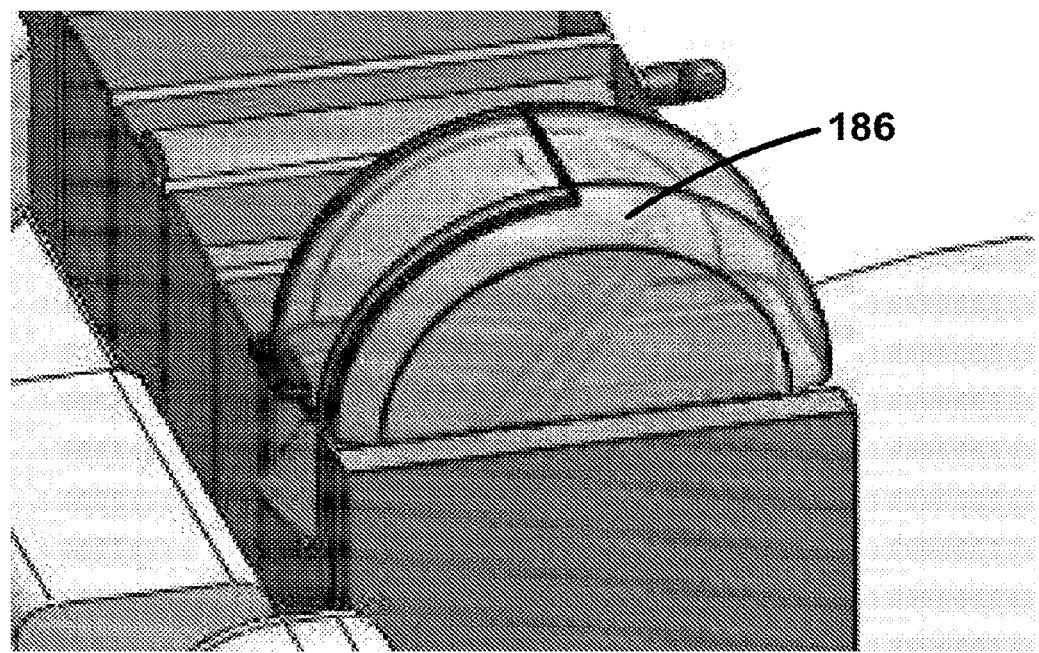
FIG. 17 a front perspective view of a safety cap for a vending system according to some embodiments of the disclosed subject matter.

Referring now to FIG. 17, some embodiments of system 100 include a trap door barrier or safety cap 186, which covers product delivery opening 122. Barrier/cap 186 is configured so that the weight of the cap is shifted forward causing the cap to be closed to order to seal in any cool air circulated by refrigeration module 116. Cap 186 is typically insulated to prevent air leaks from inside lifting mechanism 180. When cap 186 is in a closed position, it keeps vended products 106 from causing injury during sudden vehicle stoppages and prevents people from inserting their hands into lifting mechanism 180. Cap 186 is typically made of transparent or translucent material or includes see-through apertures for consumers to see when the vending cycle is completed.

Refrigeration module 116 is typically a self-contained refrigerated system integrated to provide circulated airflow within the area in product housing 104 where removable inventory cartridge 112 is positioned. In some embodiments, refrigeration module 116 is powered by a vehicle's DC battery system and a rechargeable battery pack maintains secondary power while the vehicle's power is turned off. When the vehicle power is on, the secondary battery is charged by the vehicle battery. In some embodiments, refrigeration module 116 is energized using an independent power system, such as a battery. In some embodiments, refrigeration module 116 utilizes the cooling system (not shown) of vehicle 102 in which it is installed, in whole, or in part. In some embodiments, refrigeration module 116 is located in an area remote, i.e., not immediately adjacent, to product housing 104 but is joined with the housing via air exchange conduits. For example, in buses, refrigeration module 116 is positioned on the floor of the bus while the main vending housing is mounted at a higher, eye-level area.

Figure 18:
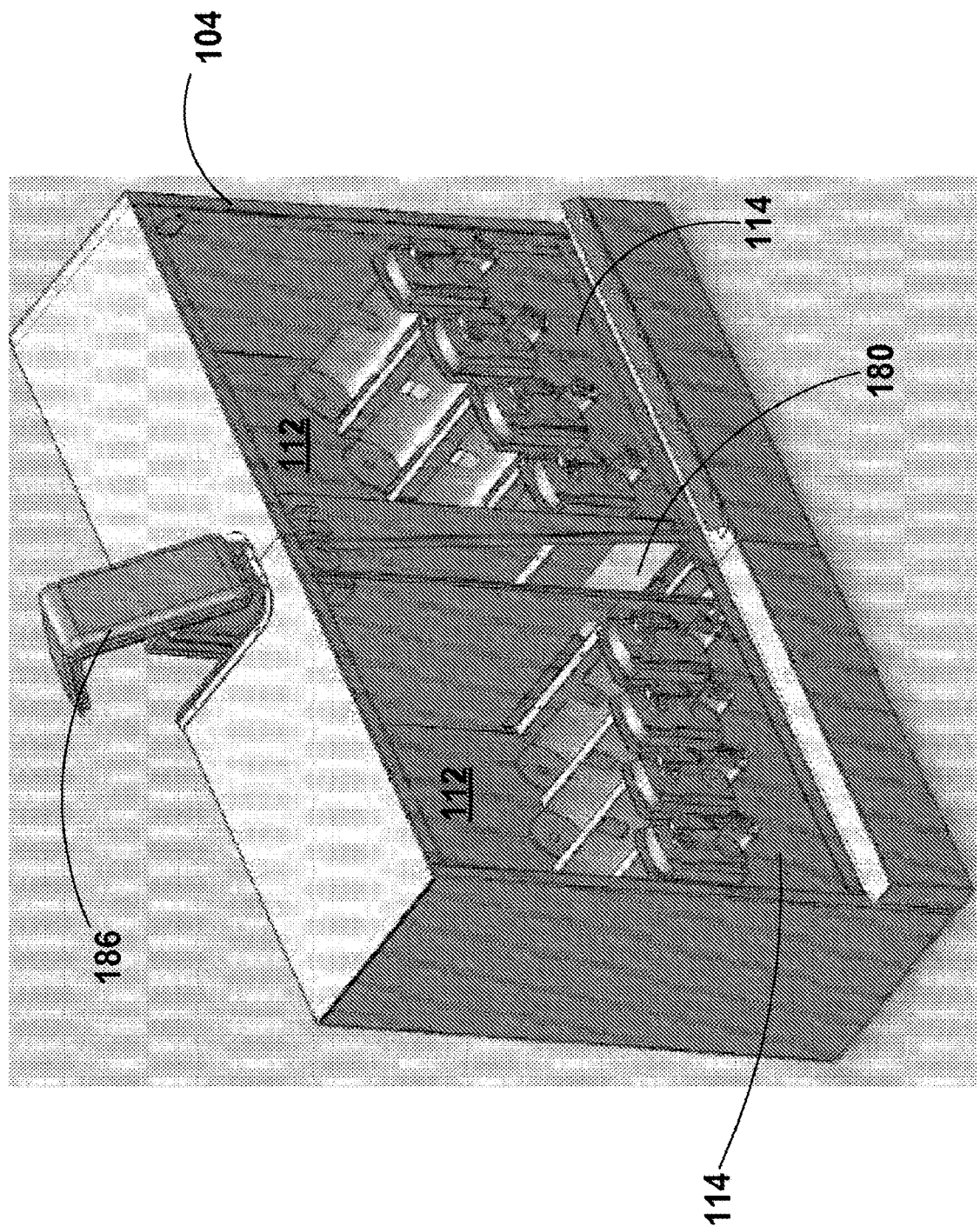
FIG. 18 is a front perspective section view of a system including dual removable inventory cartridges according to some embodiments of the disclosed subject matter.

Referring now to FIG. 18, some embodiments of system 100 include a plurality of removable inventory cartridges 112 and corresponding product dispensing mechanisms 114, all of which use a common lifting mechanism 180 to deliver products 106 to the consumer.

Figure 19:
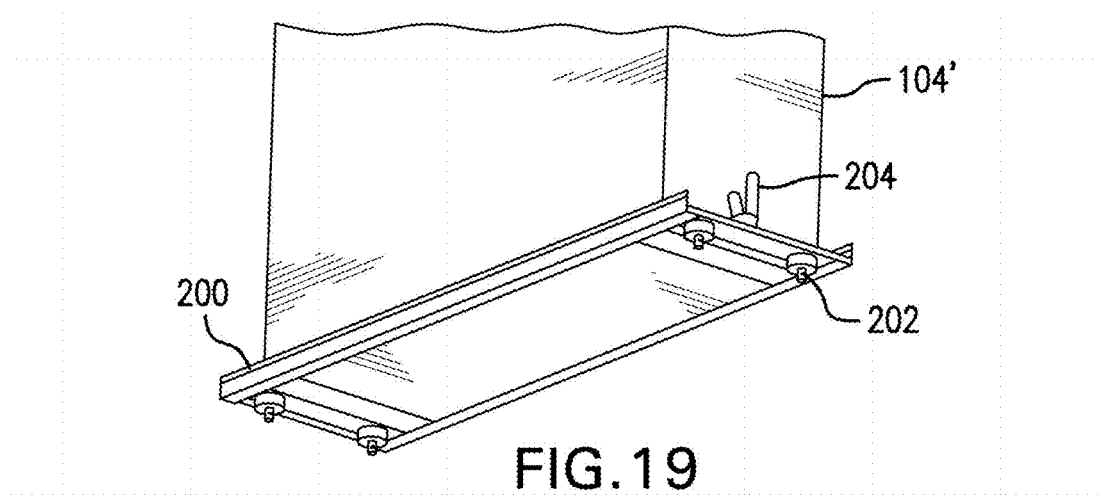
FIG. 19 is a partial bottom perspective view of a mounting bracket for a vending system according to some embodiments of the disclosed subject matter.
Figure 20:
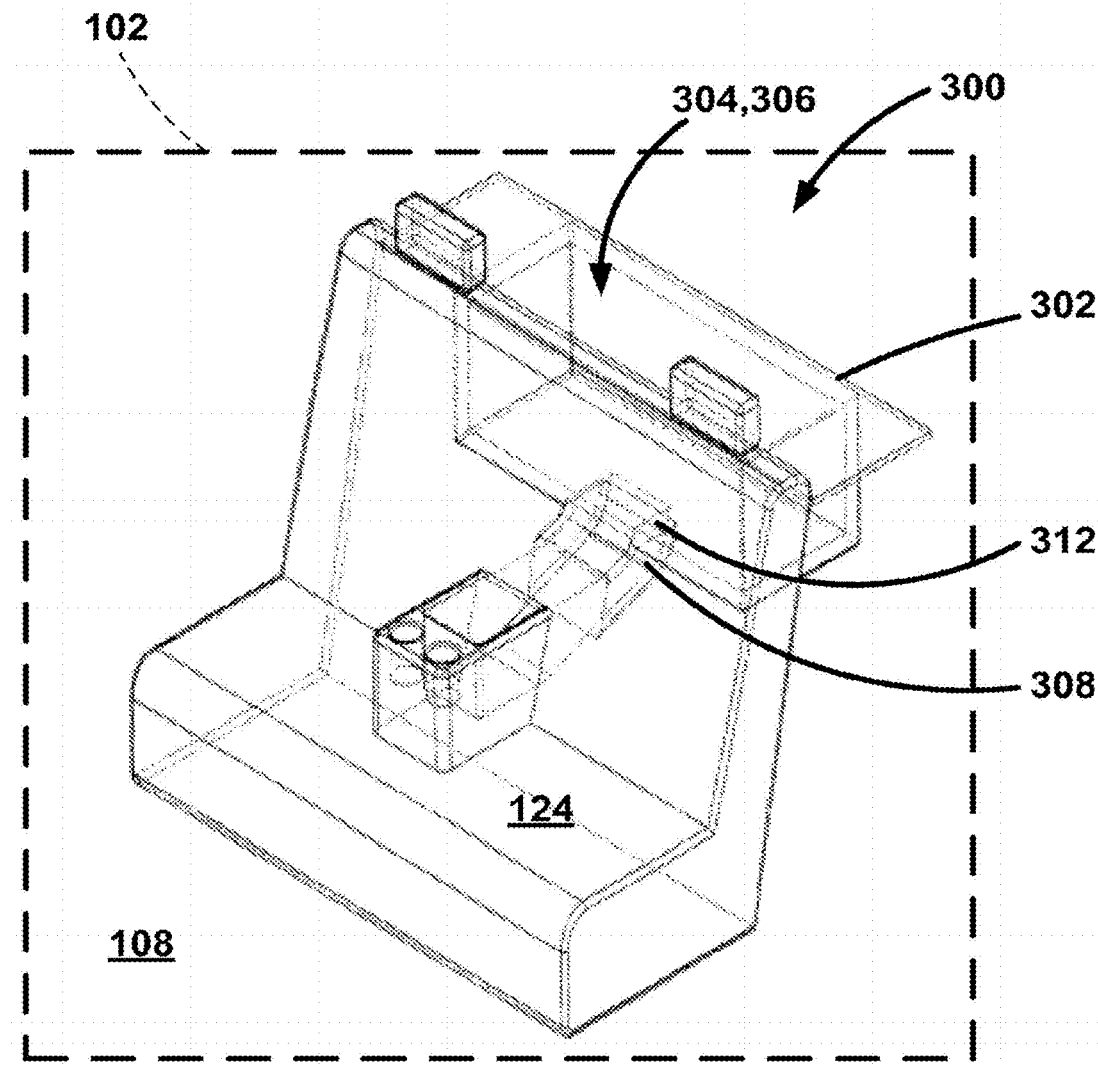
FIG. 20 is a front perspective view of a vending system according to some embodiments of the disclosed subject matter.
Figure 21:
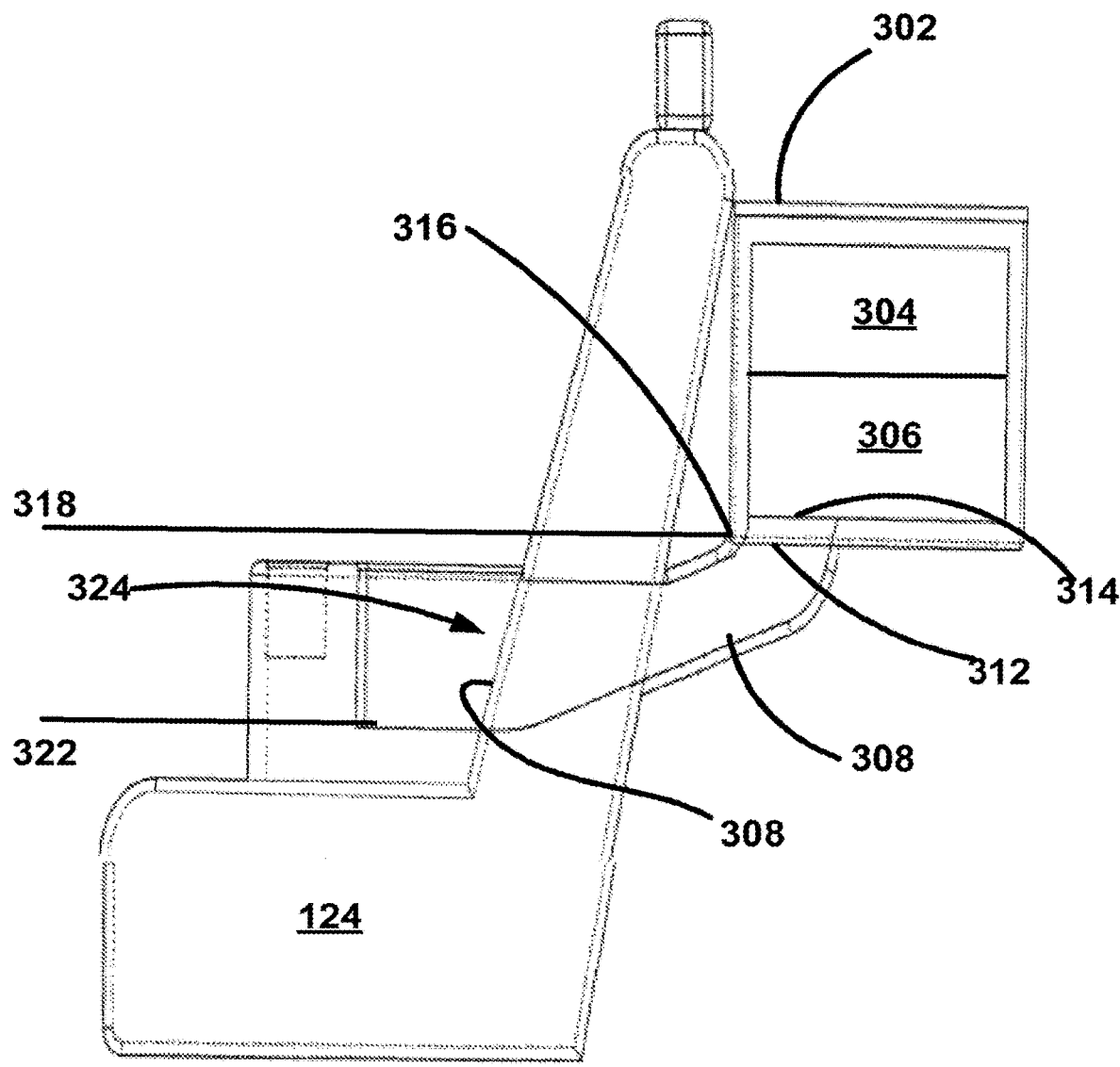
FIG. 21 is a side section elevation view of a vending system according to some embodiments of the disclosed subject matter.
Figure 22:
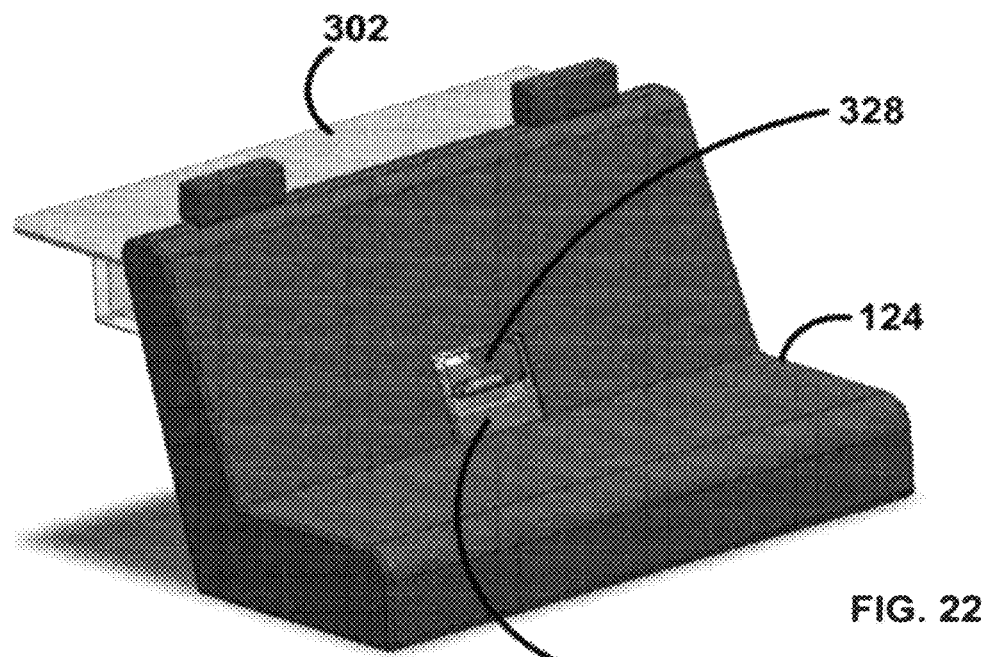
FIG. 22 is a front perspective view of a vending system according to some embodiments of the disclosed subject matter.

Referring now to FIG. 19, some embodiments of the disclosed subject matter include mechanisms for reducing shock and vibration. Vibration inside a moving vehicle can be destructive to components in a vending system. Thus, some embodiments include a product housing 104' that is shock mounted to reduce or eliminate shock and vibration. In some embodiments, product housing 104' is mounted using a bracket 200 with at least one anti-vibration shock absorber 202 rated for a fully-loaded vending system. As mentioned above, system 100 and other embodiments are typically configured as a modular quick release system, e.g., product housing 104' snaps into place onto bracket 200 and is removed quickly via a latch 204 for replacement as needed. As one skilled in the art can appreciate, bracket 200 is adaptable to any type of vehicle type to allow for the vending system to function when installed on a multitude of vehicle types.

Although not illustrated, embodiments of the disclosed subject matter typically include a user interface, e.g., a touchscreen interface including a payment receiver for credit card, and wireless devices such as smart phones, tablets, or lap top computers.

Of course, the user interface can be configured to include a means for cash payment. In some embodiments, a computer, or smart tablet device is configured to display the items available for sale. The display can include photos or descriptions of the items offered. Other information such as price, availability, product characteristics, etc., is typically displayed on the screen. A consumer either swipes a credit card or uses a wireless device to authorize a purchase. Once the system validates the purchase information, the system vends the item and delivers it to the consumer. The system includes a computer having a processor and memory and a display arranged for viewing by a consumer. One or more code modules are executed in the processor and provide interactive selection controls on at least a portion of the display. The passenger causes an item to be vended from the vending system by interacting with the selection controls, for example by pressing virtual buttons on the screen.

Referring now to FIGS. 20-24, some embodiments of the disclosed subject matter include a vending system 300 for use in a vehicle that gravity feeds products 106 from a product housing 302 to passenger compartment 108 in vehicle 102 instead of using a lifting mechanism. Similar to system 100, system 300 typically, but not always, includes a removable inventory cartridge 304 which cooperates with a product dispensing mechanism 306 to deliver products to passenger compartment 108 of vehicle 102 via a product delivery conduit 308.

Figure 23:
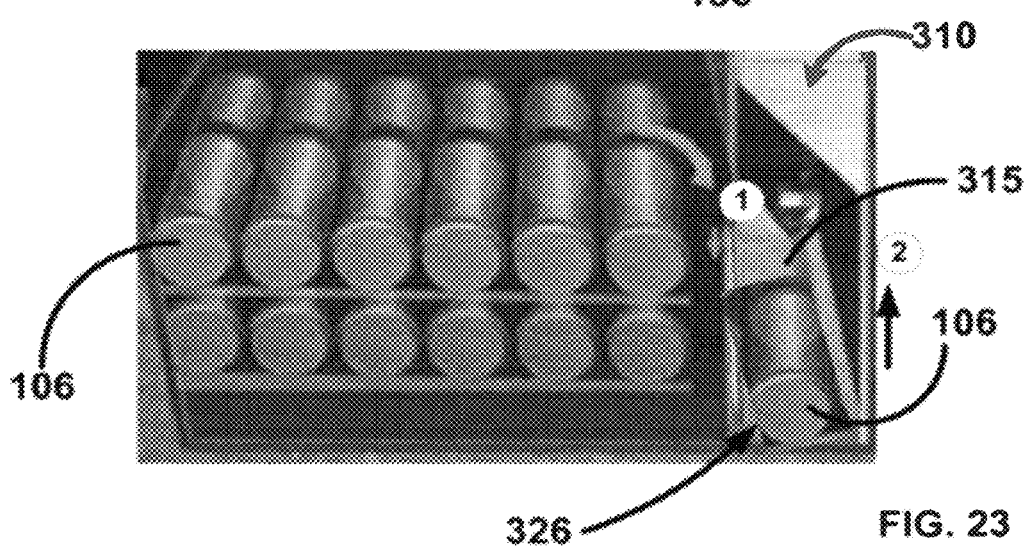
FIG. 23 is a side section elevation view of a vending system according to some embodiments of the disclosed subject matter.

Product housing 302 is typically positioned in a trunk compartment 310 of vehicle 102. Product housing 302 includes a product distribution opening 312. Removable inventory cartridge 304 is removably positioned within product housing 302. Similar to product dispensing mechanism 114 described above, product dispensing mechanism 306 includes a product dispensing opening 314 for dispensing product 106 from removable inventory cartridge 304 in product housing 302 to the product dispensing opening and product distribution opening 312. Referring now to FIG. 23, in some embodiments, product dispensing mechanism 306 includes a moving platform 315 that moves between the product dispensing opening and product distribution opening 312 to move product 106 from removable inventory cartridge 304 to product delivery conduit 308.

Product delivery conduit 308 includes a first end 316 having a first elevation 318 and a second end 320 having a second elevation 322. First end 316 is joined with product dispensing opening 314 and second end 320 includes a product delivery opening 324, which is positioned in passenger compartment 108 of vehicle 102. First elevation 318 is greater than second elevation 322 thereby allowing product 106 to be gravity fed from product housing 302 to product delivery opening 324 via product delivery conduit 308.

Figure 24:
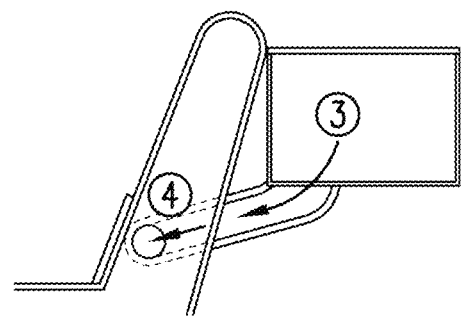
FIG. 24 is a side section elevation view of a vending system according to some embodiments of the disclosed subject matter.
Figure 25:
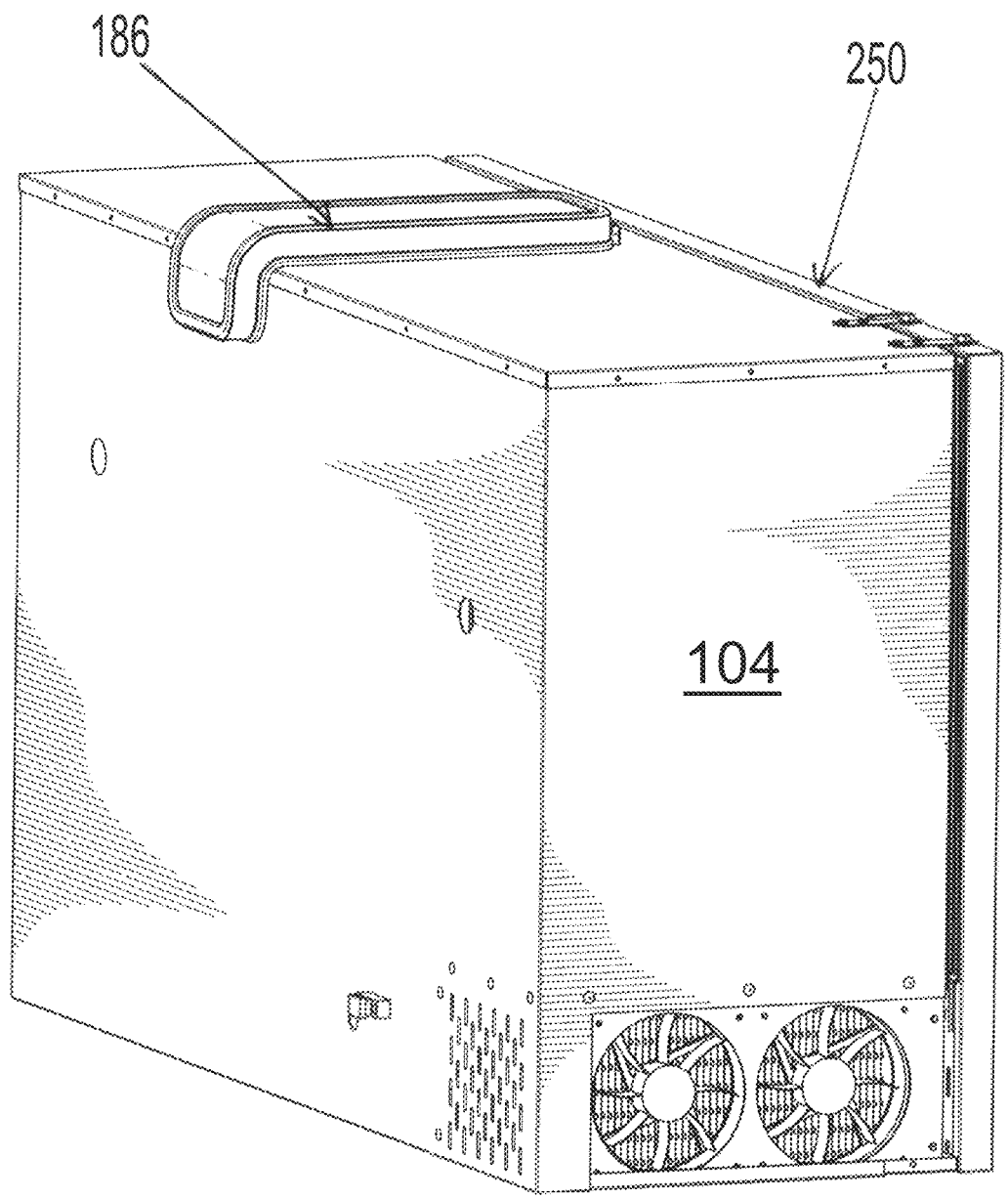
FIG. 25 is a front perspective view of a product housing for a vending system according to some embodiments of the disclosed subject matter.
Figure 26:
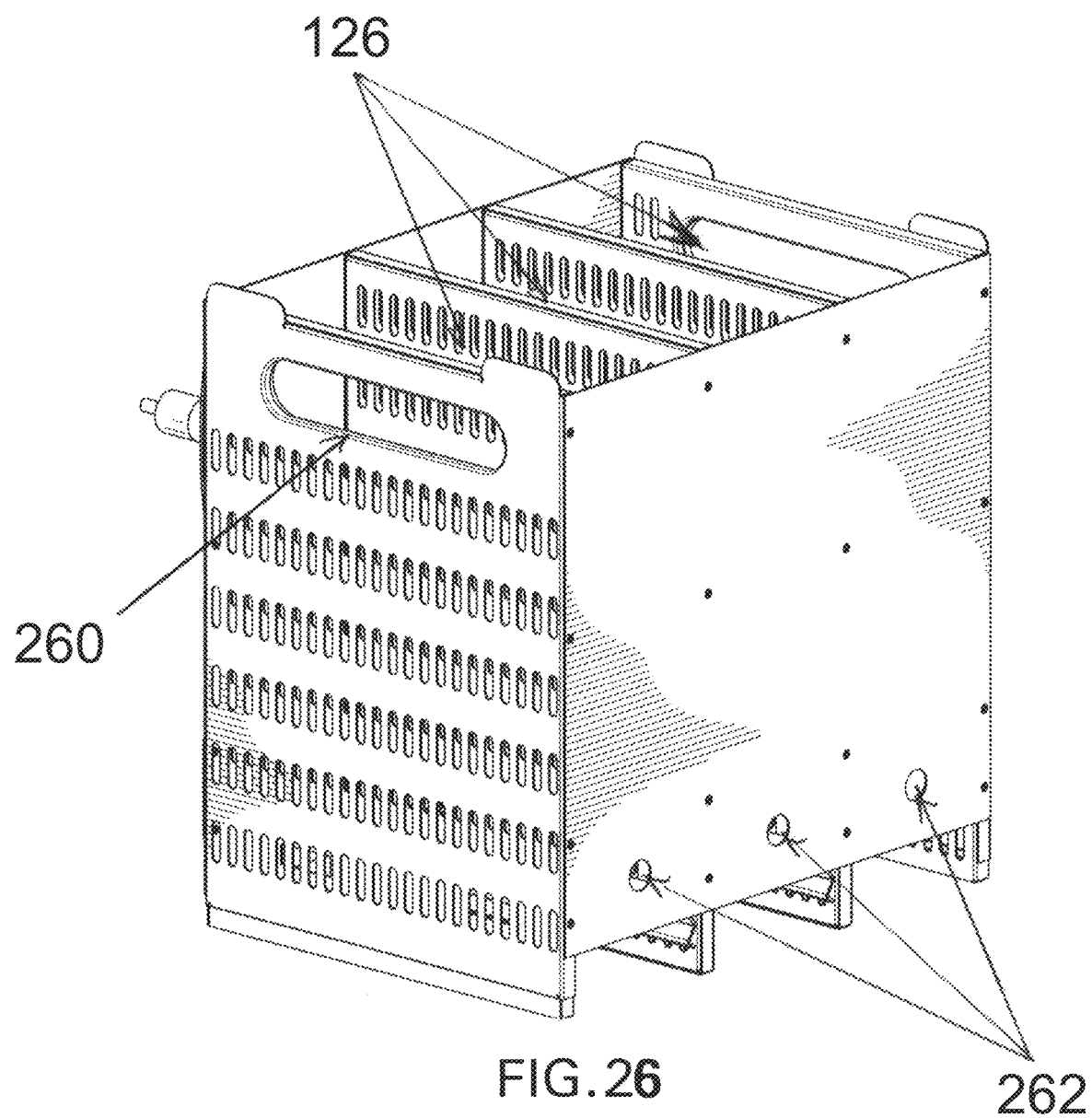
FIG. 26 is a removable inventory cartridge for a vending system, according to some embodiments of the disclosed subject matter.
Figure 27:
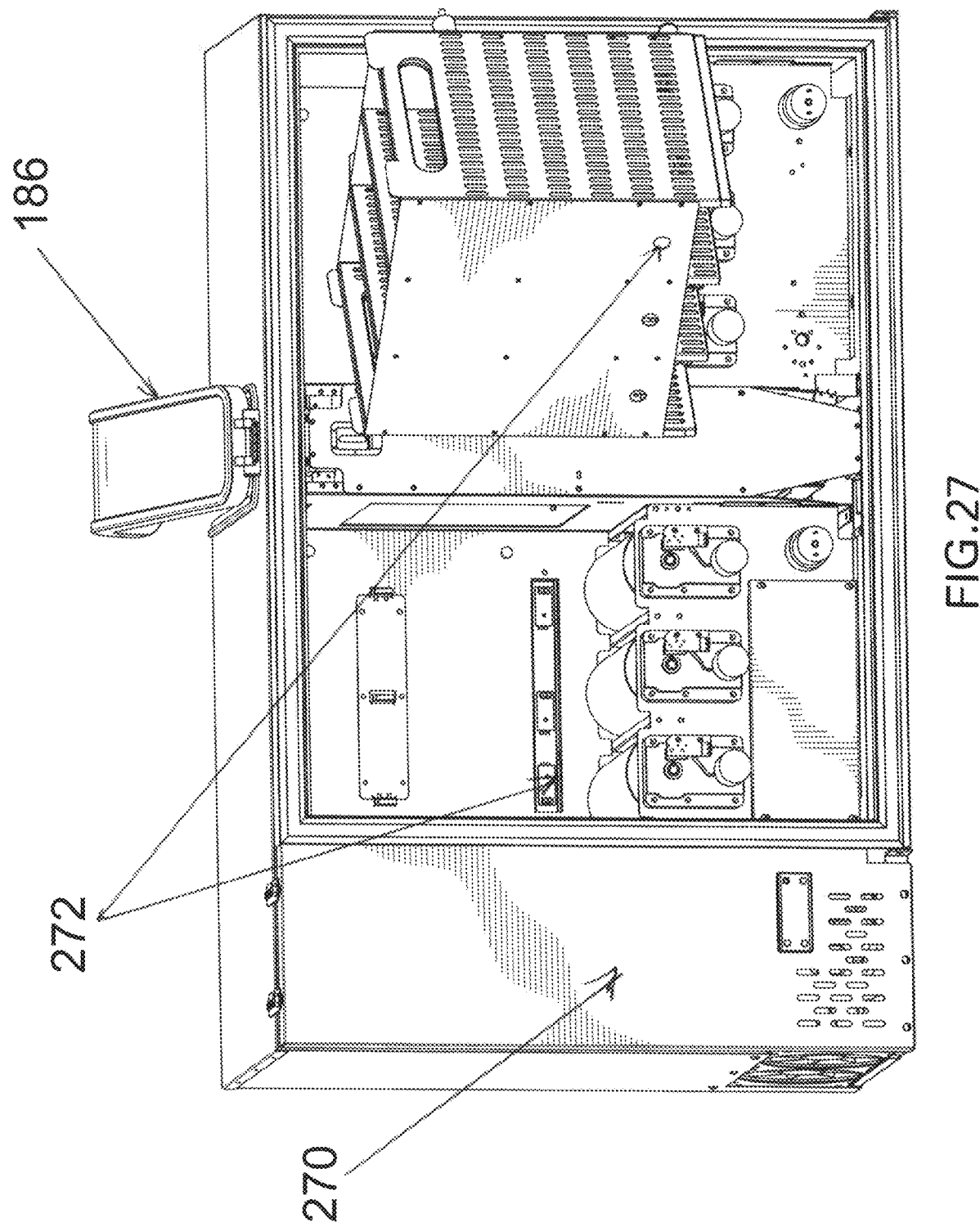
FIG. 27 is a side section elevation view of a vending system according to some embodiments of the disclosed subject matter.

Referring now to FIGS. 23 and 24, in use, released vended product 106 drops into a channel 326 as shown by arrow 1. Channel 326 typically, but not always, includes moving platform 315 as shown by arrow 2. Moving platform 315 transports vended product 106 along channel 326 via a gravity-fed ramp, i.e., product delivery conduit 308, which extends through or between rear passenger seat(s) 124 as indicated by arrow 3. Vended product 106 stops at barrier/door/cap 186 at the passenger side of seat 124 as discussed above. In this way, consumers can access vended products 106 through barrier/cap 186. The consumer can remove vended product 106 from an open slot 328 or by opening cap 186 to retrieve the vended product as in arrow 4.

Systems according to the disclosed subject matter offer benefits over known systems. Some embodiments of the disclosed subject matter include a removable inventory cartridge. The removable feature of the removable inventory cartridge enables quick inventory replacement once the products are sold out or in need of replenishment. Prestocked removable inventory cartridges can be stacked in a warehouse to allow for quick on-the-fly swap-out in vehicles as needed, thus overcoming the space limitation and reducing operational downtime.

Moreover, the removable inventory cartridge allows for customized introduction of products for specific segments of consumers, market segments, or times of day. For example, pre-stocked removable inventory cartridges comprising breakfast items can be swapped-out for a lunch items removable inventory cartridge to offer consumers different selections throughout the day or different items depending on the time of year, the weather, the location, or the type of vehicle.

Systems of the disclosed subject matter are configured to gravity feed products from a rear compartment of a vehicle to a passenger compartment of the vehicle. Gravity feed systems are less complex and do not require lifting mechanisms.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A vending system for use in a vehicle, comprising:
    a product housing positioned in a trunk compartment of a vehicle, said product housing including a product distribution opening;
    a product dispensing mechanism including a product dispensing opening, said product dispensing mechanism being configured for dispensing a product, from a product inventory, from said product housing to said product dispensing opening;
    one or more sensors configured to detect the presence one or more products in the product inventory; and
    a product delivery conduit including a first end having a first elevation and a second end having a second elevation, said first end being joined with said product distribution opening and said second end including a product delivery opening, which is positioned in a passenger compartment of said vehicle, wherein said first elevation is greater than said second elevation and said product is gravity fed from said product housing to said product delivery opening via said product delivery conduit.

2. The system as recited in claim 1, wherein the one or more sensors are configured to detect signals selected from the group consisting of: optical signals; audio signals; and radio signals.

3. The system according to claim 1, further comprising a trap door barrier covering said product delivery opening.

4. The system according to claim 1, wherein said product delivery opening is in communication with said passenger compartment via an aperture in a passenger seat in said passenger compartment.

5. The system according to claim 1, further comprising product delivery vessels for transporting said product from said product housing to said product delivery opening.

6. The system according to claim 1, further comprising a removable inventory cartridge configured to be removably positioned within said product housing and configured to contain at least one of beverage and food products.

7. The system according to claim 6, wherein the one or more sensors are configured to detect when a type of product from the product inventory is no longer in the removable inventory cartridge.

8. The system according to claim 6, wherein said removable inventory cartridge includes a plurality of adjustable product slots for temporarily retaining products of different sizes within said cartridge.

9. The system according to claim 8, wherein each of the plurality of adjustable product slots has a corresponding sensor from the one or more sensors.

10. A vending system for use in a vehicle, comprising:
a product housing positioned in a vehicle, said product housing including an exposed surface having a product delivery opening;
a removable inventory cartridge removably positioned within said product housing;
a product dispensing mechanism including a product dispensing opening, said product dispensing mechanism being configured for dispensing a product, from a product inventory, from said removable inventory cartridge in said product housing to said product dispensing opening;
one or more sensors configured to detect the presence one or more products in the product inventory;
a product delivery conduit including a first end having a first elevation and a second end having a second elevation, said first end being joined with said product dispensing opening and said second end defining a product delivery opening, which is formed in said exposed top surface of said product housing and positioned in a passenger compartment of said vehicle, wherein said first elevation is less than said second elevation; and
a lifting mechanism positioned within said product delivery conduit for mechanically lifting said product dispensing opening to said product delivery opening.

11. The system according to claim 10, wherein said removable inventory cartridge includes a plurality of adjustable product slots for temporarily retaining products of different sizes within said cartridge.

12. The system according to claim 10, wherein said removable inventory cartridge includes a mechanism for preventing said product from exiting said cartridge when said cartridge is not positioned within said product housing.

13. The system according to claim 10, wherein said product dispensing mechanism includes at least one of a ramp and a moving platform in cooperation with said product delivery conduit.

14. The system according to claim 10, further comprising a trap door barrier covering said product delivery opening.

15. The system according to claim 10, wherein said product delivery opening is in communication with said passenger compartment via said product delivery opening in said passenger compartment.

16. The system according to claim 10, further comprising product delivery canisters for transporting said product from said product housing to said product delivery opening.

17. A vending system for use in a vehicle, comprising:
a product housing positioned in a trunk compartment of a vehicle, said product housing including a product distribution opening;
a removable inventory cartridge removably positioned within said product housing, said removable inventory cartridge including a plurality of adjustable product slots for temporarily retaining products of different sizes within said cartridge;
a product dispensing mechanism including a product dispensing opening for dispensing a product, from a product inventory, from said removable inventory cartridge in said product housing to said product dispensing opening and said product distribution opening;
one or more sensors configured to detect the presence one or more products in the product inventory; and
a product delivery conduit including a first end having a first elevation and a second end having a second elevation, said first end being joined with said product distribution opening and said second end including a product delivery opening, which is positioned in a passenger compartment of said vehicle, wherein said first elevation is greater than said second elevation and said product is gravity fed from said product housing to said product delivery opening via said product delivery conduit.

18. The system according to claim 17, further comprising a refrigeration module for at least partially refrigerating said product housing.

19. The system according to claim 17, wherein said product dispensing mechanism includes a moving platform in cooperation with said product delivery conduit.

20. The system according to claim 17, further comprising a door covering said product delivery opening.

* * * * *